United States Patent [19]
Poe, Jr.

[11] Patent Number: 6,101,447
[45] Date of Patent: Aug. 8, 2000

[54] OIL AND GAS RESERVOIR PRODUCTION ANALYSIS APPARATUS AND METHOD

[75] Inventor: Bobby Dale Poe, Jr., Houston, Tex.

[73] Assignee: Schlumberger Technology Corporation, Sugar Land, Tex.

[21] Appl. No.: 09/023,133

[22] Filed: Feb. 12, 1998

[51] Int. Cl.[7] .................................................. G06F 19/00
[52] U.S. Cl. ............................................................ 702/13
[58] Field of Search ........................ 702/12, 13; 166/245, 166/250.01, 252.1, 252.2, 250.15, 52, 53, 54, 369, 370, 371, 372

[56] References Cited

U.S. PATENT DOCUMENTS

| | | | |
|---|---|---|---|
| 4,921,048 | 5/1990 | Crow et al. ................................ | 166/53 |
| 5,675,147 | 10/1997 | Ekstrom et al. ........................... | 702/11 |
| 5,881,811 | 3/1999 | Lessi et al. .............................. | 166/245 |

OTHER PUBLICATIONS

One–page, single–sided leaflet: PSI Performance Sciences, Inc. "The Reciprocal Productivity Index Method for Practical Reservoir Performance Analysis", Principal contacts are: Clark Huffman and Dr. James W. Crafton, (undated).

One–Page four–way folded brochure: "It Is Information Technology", SPE Annual Technical Conference and Exhibition, Petroleum Information/Dwights (undated).

Tri–fold brochure: "DSSC Material Balance", Dwights Energydata, Inc., (1995).

Tri–fold brochure: "OGRE Partners, The Power To Be Productive", OGRE Partners (1997).

One–page, double sided leaflet: "Decision Support Software for Oil & Gas Project Teams; Better Decisions start with Better Knowledge . . . and now, Knowledge is Expanding with PetroVR.", Ceasar Petroleum Systems, L.L.C., Revised: May 1997.

Tri–fold brochure: PUMA production data management and analysis, PGS Tigress (UK) Ltd. (1997).

One–page, double sided leaflet: "MEI Software Solutions for All Applications", Maurer Engineering Inc. (undated).

Seven–page brochure: "Reservoir Analysis Tools For The Way You Work", Petroleum Information/Dwights (1997).

Five–fold brochure: "Now—Workbench for Windows, WorkBench, The Petroleum Workbench", Scientific Software–Intercomp, Inv. (undated).

One–page, single sided leaflet: "WorkBench, The Ultimate Reservoir Management Tool for Computer Aided Production", Scientific Software–Intercomp, Inc. (undated).

One–page, double sided leaflet: "U.S. PEEP 32, Petroleum Economic Evaluation Program and Decline Analysis," Merak (undated).

Tri–fold brochure: "Projections", Merak Projects Inc., (undated).

Tri–fold brochure: "Advanced market intelligence to help build your business.", Petroleum Information/Dwights LLC. (1997).

(List continued on next page.)

Primary Examiner—Donald E. McElheny, Jr.
Attorney, Agent, or Firm—Gordon G. Waggett; Robin C. Nava

[57] ABSTRACT

A petroleum reservoir production modeling apparatus and method is disclosed which incorporates a complete (from reservoir to wellhead) production systems analysis system for the evaluation of petroleum reservoir production performance, using industry accepted techniques of analysis. A computer generated model facilitates the determination of well and formation properties in a computerized methodology, efficiently, reliably and accurately, thereby facilitating subsequent changes in wellbore properties to maximize well production. The method includes a rigorous analytic reservoir inflow performance model for a variety of well types and reservoir outer boundary conditions and drainage area shapes, and uses industry accepted production analysis techniques. These techniques accepted in the industry include material balance, decline curve analysis, and non-linear minimization procedures. Field-recorded production data is evaluated to obtain estimates of the well or formation properties. Statistical techniques are used to minimize or eliminate the effects of outlier (i.e. noise) points in the data.

45 Claims, 9 Drawing Sheets

OTHER PUBLICATIONS

Tri–fold brochure: "PI Data Sets Arrive Ready to Plug and Play . . . So You Spend Your Time Using Your GIS, Not Building it.", Petroleum Information Corporation (1996).

Pamphlet: "Petroleum Experts, Engineering Software Development", containing 8 leaflets, Petroleum Experts Limited (undated).

48–Page "PROMAT User's Manual, Version 3.1", S.A. Holditch & Associates, Inc. (Jun. 1992), unbound.

Article "Decline Curve Analysis Using Type Curves" Fetkovich, SPE, Phillips Petroleum Co., Society of Petroleum Engineers (1960).

Article: SPE 22921, "Application of a General Material Balance for High–Pressure Gas Reservoirs", Fetkovich, Reese, and Whitson, Society of Petroleum Engineers Inc., pp. 355–370 (1991).

Article: SPE 28628, "Useful Concepts for Decline Curve Forecasting, Reserve Estimation, and Analysis", M.J. Fetkovich, E.J. Fetkovich, and M.D. Fetkovich, Phillips Petroleum Co., Society of Petroleum Engineers, Inc., pp. 217–232 (1994).

Article: "Decline–Curve Analysis Using Type Curves–Case Histories", Fetkovich, Vienot, Bradley & Kiesow, SPE, Phillips Petroleum Co., Society of Petroleum Engineers, SPE Formation Evaluation, pp. 171–190 (Dec. 1987).

Article: SPE 29572, "Decline Curve Analysis Using Type Curves: Horizontal Wells", Shih and Blasingame, Society of Petroleum Engineers, Fax pp. 1–36 (1995).

Article: SPE 35205, "Evaluation of Injection Well Performance Using Decline Type Curves", Doublet and Blasingame, Society of Petroleum Engineers, Inc., pp. 1–39 (1996).

Article: SPE 28688, "Decline Curve Analysis Using Type Curves–Analysis of Oil Well Production Data Using Material Balance Time: Application to Field Cases", Doublet, Pande, McCollum and Blasingame, Society of Petroleum Engineers, Inc., pp. 1–24 (1994).

Article: SPE 30774, Decline Curve Analysis Using Type Curves: Water Influx/Waterflood Cases, Doublet and Blasingame, Society of Petroleum Engineers, Inc. pp. 1–23 (1995).

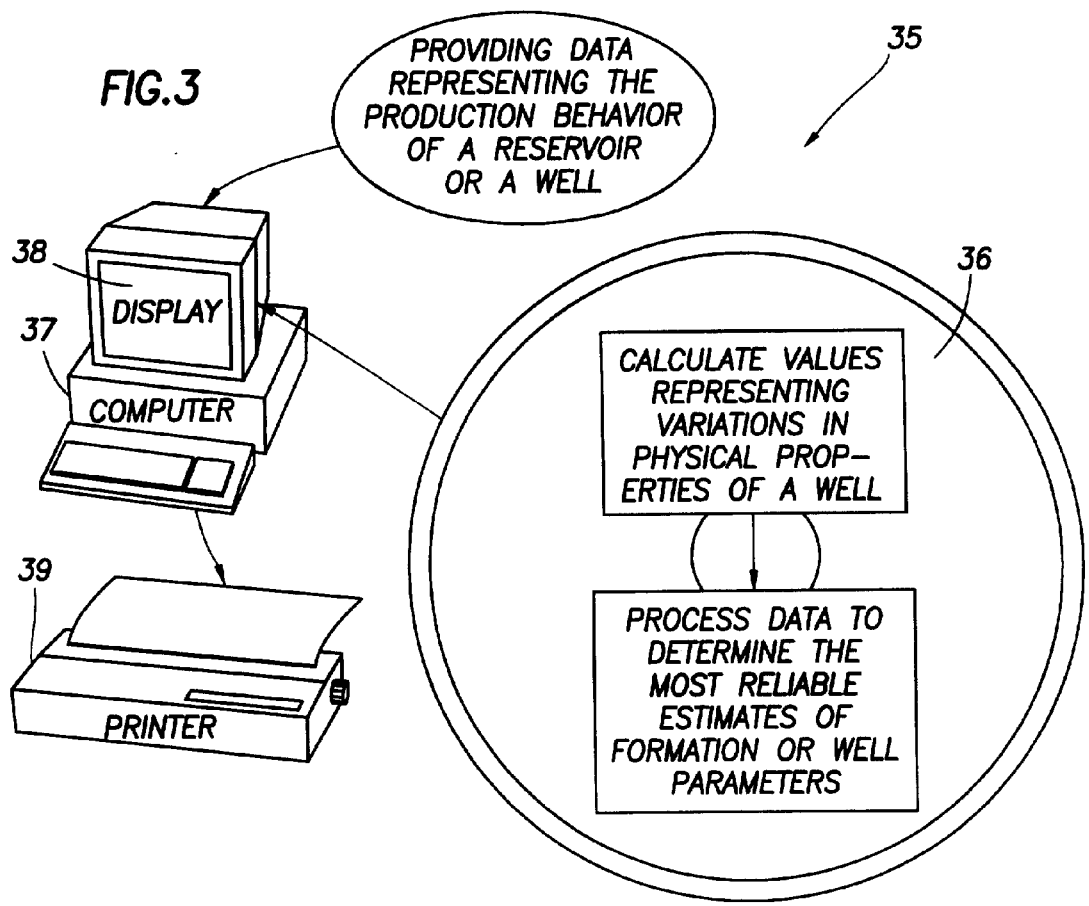
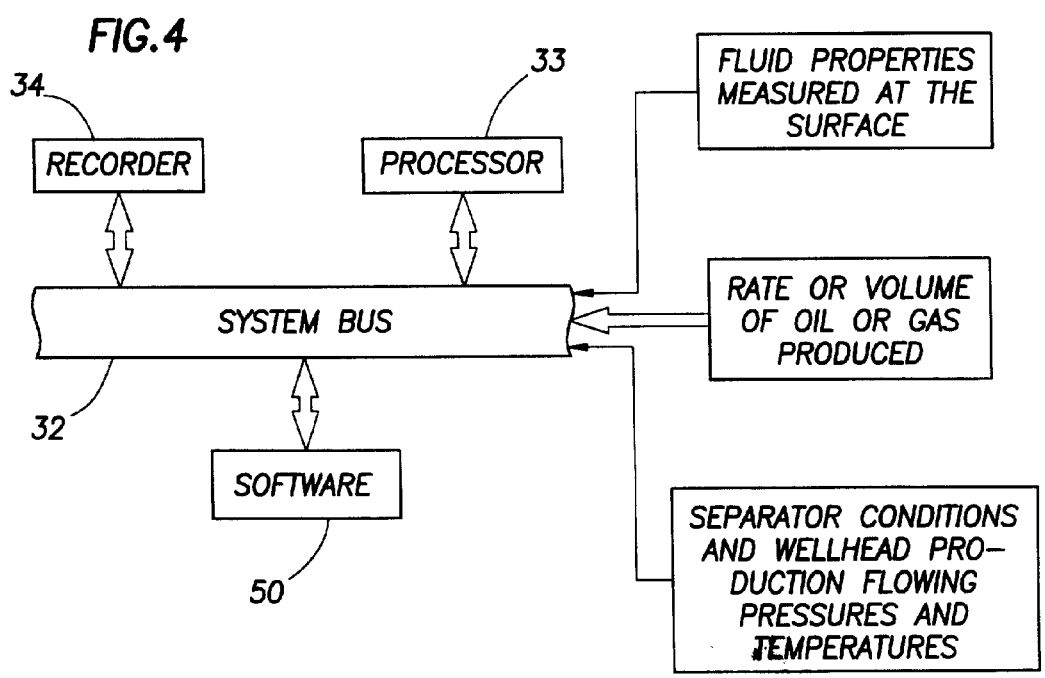

OIL AND GAS RESERVOIR PRODUCTION ANALYSIS APPARATUS AND METHOD

BACKGROUND OF THE INVENTION

1. Field of the Invention

This invention relates to an apparatus and method used to analyze reservoir properties and production performance of wells using production data that may contain multiple reservoir and well types.

2. Description of the Prior Art

Procedures for production systems analysis have been employed for some time in the oil and gas industry. One such procedure employed is known as nodal systems analysis, sometimes called production systems analysis or production optimization.

Nodal systems analysis is a procedure for determining that flow rate at which an oil or gas well will produce. Further, nodal systems analysis has been used for evaluating the effect of various components on well production, such as the tubing string size, flow line size, separator pressure, choke sizes, safety valves, downhole restrictions, and well completion techniques, including gravel packing and perforating wells.

Using nodal systems analysis, petroleum engineers have been able to collect wellhead data and then solve equations which result in optimizing the entire production system downhole to obtain the most efficient objective flow rate. This procedure has been performed manually, or with the aid of a calculator or computer.

Many well production systems operate inefficiently. Operators of wells using nodal systems analysis evaluate the solutions at various nodes, or locations, such as the bottom of a well, the top of a well, or at the separator, which is located above the surface of the ground.

For example, the effect of a change in separator pressure can be illustrated using nodal systems analysis by taking the solution point at the separator. Then the separator pressure can be optimized based upon possible compressor installations to elevate the gas pressure for sales, or for gas lift systems. This is one example of how nodal systems analysis currently is employed.

In some cases, decline curve analysis has been used to analyze and interpret production rate and pressure data. Results of these decline curve analyses reveal information about reservoir properties such as skin factor and formation permeability. Furthermore, in-place fluid volumes, movable oil at current conditions, and the reservoir drainage area are all factors to be considered in such an analysis.

"Rigorous" analysis uses actual field data to make predictions rather than relying solely upon theoretical models, and therefore rigorous analysis using actual field data is preferred, if such data is available. Methodologies have been developed to model decline type curves or graphs for analysis of the depletion or injection performance of a well.

There exists in the petroleum industry computerized methods of determining basic well performance, in which the program is capable of assisting an operator with forecasting the volume or amounts of oil that may be produced from a well, or to model the effects of tubing sizes or other physical flow point restrictions. These prior methods have been limited primarily to variables dealing with the hydraulics of the wellbore.

Other prior art computer modeling methods have been used in the industry which are capable of: (1) history matching existing data to develop a reservoir description and then predicting well performance, and (2) predicting well performance using specified reservoir properties.

Importantly, these latter computer modeling methods do not contain wellbore hydraulic calculations, such as the wellbore outflow correlations and pressure loss factors. Thus, these prior methods cannot consider wellhead pressures and other such commonly measured surface production data directly within the program itself.

Reservoir production analysis and predictive methods of the prior art have been limited in their capabilities and scope. They have not generally been capable of performing in one computerized operation the appropriate consideration of all relevant reservoir parameters from production data analysis in obtaining reliable estimates of well parameters.

What has been needed in the industry is a petroleum reservoir production modeling system that fully incorporates a complete (from reservoir to wellhead) production systems analysis system for the evaluation of petroleum reservoir production performance, using industry accepted techniques of analysis. There exists a need for a reliable and efficient way for petroleum operators to determine well and formation properties in one computerized methodology, efficiently, reliably and accurately.

The petroleum industry has long needed a system for analyzing and providing a rigorous analytic reservoir inflow performance model for a variety of well types and reservoir outer boundary conditions and drainage area shapes, and which uses industry accepted production analysis techniques. These techniques accepted in the industry include material balance, decline curve analysis, and non-linear minimization procedures.

There has been a need in the industry for a logical analysis system that is capable of assisting a well operator with choosing the most reliable analysis technique, among known reservoir production analysis techniques, and also is capable of indicating to the user which analysis technique provides the most reliable estimate of each parameter.

Additionally, there has been a need for a generic statistical analysis procedure for analyzing field-recorded production data to minimize or eliminate the effects of outlier (i.e. noise) points in the data.

The invention of this application addresses these industry needs, and is more fully described below.

SUMMARY OF THE INVENTION

A petroleum reservoir production modeling apparatus and method is disclosed which incorporates a complete (from reservoir to wellhead) production systems analysis system for the evaluation of petroleum reservoir production performance, using industry accepted techniques of analysis. A computer generated model facilitates the determination of well and formation properties reliably in a computerized methodology, efficiently, reliably and accurately.

The method includes a rigorous analytic reservoir inflow performance model for a variety of well types and reservoir outer boundary conditions and drainage area shapes, and uses industry accepted production analysis techniques. These techniques accepted in the industry include material balance, decline curve analysis, and non-linear minimization procedures. Field-recorded production data is used to minimize or eliminate the effects of outlier (i.e. noise) points in the data.

This invention comprises, in one embodiment, a relatively general purpose petroleum reservoir production analysis and forecasting system. It is an object of the invention to evaluate the production data of oil, gas, or brine wells and fields to best estimate the well and reservoir properties such as effective permeability, steady-state skin effect, drainage area extent, initial fluids-in-place, effective fracture half-length, fracture average conductivity, and effective horizontal wellbore length in the reservoir.

The invention may be used to design and evaluate the effectiveness of production enhancement treatments that are available. In other applications, it may advantageously estimate the future production capability of a well or field. In some cases, it enables an operator to perform a comparative economic evaluation of optimized production enhancement designs.

In one embodiment of the invention, a device comprising a means for storing instructions, and then executing the instructions, is used. The invention relates to providing first raw data representing the production behavior of a reservoir or well to a computer, and then calculating first values using said first raw data, said first values correlating to said first raw data. The first values representing reservoir flow rates, cumulative production, and bottom hole flowing pressures. At that point, it is possible to calculate a set of second values, said second values representing one or more production data analysis results which characterize said reservoir or well, wherein the production data analysis results having varying degrees of reliability. In the invention it is possible to determine the most reliable production data analysis result, facilitating a production forecast representing the production rates and cumulative production of said reservoir or well. A computer display is provided to display results.

The production analyses available in the use of this invention include a) water control diagnostics, b) material balance analyses, c) empirical decline curve analyses, d) graphical and automated advanced decline curve analyses, and e) non-linear minimization of production data with analytic pressure and rate transient solutions governing fluid flow in the reservoir.

The predictive component of the system includes single-layer reservoir production prediction using the determined or specified reservoir and well properties and the forecasting capabilities of the empirical decline curve models, any of the advanced decline curve analysis models available in the system, and even pressure or rate transient solutions in the system catalog for the various well and reservoir types. Furthermore, multi-layer reservoir production forecasting is available in the system using the commingled reservoir solution procedure and a catalog of pressure and rate transient solutions. By "catalog of pressure and rate transient solutions", we refer to a set of analytic mathematical solutions of the governing differential equations (fluid flow relationships) for the specified inner and outer boundary conditions. The production forecasting capabilities of the system using the empirical decline curve analysis models facilitate simulation of the future productivity of a well or field to either a future time level or a future average reservoir pressure level. The production forecasting capabilities of the system using the advanced decline curve analysis models include the same options as the empirical decline analysis models, as well as the capability of production prediction of a well or field to a future production rate level.

The single-layer reservoir production forecasting capability of the system using the rate and pressure enables the estimation of the future production performance of a well for a series of specified inner boundary condition values and small variations in the near-wellbore effects parameter values.

The multi-layer reservoir production capability facilitates the specification of a commingled reservoir system in which the inner boundary condition values are permitted to vary as a function of time. Comparative economic evaluation of the effectiveness of production enhancement treatments is available with this system in which the reservoir being simulated in the both the unstimulated (i.e. unfractured) and stimulated (i.e. fractured) cases can be specified as a multi-layer reservoir with differing well completion types, initial and intrinsic properties, and layer drainage areas, outer boundary conditions, and shapes. By fracturing, we refer to the commonly known procedure by which a formation is hydraulically fractured to increase oil or gas production from a reservoir.

BRIEF DESCRIPTION OF THE DRAWINGS

FIG. 3 indicates how software used in the present invention, which exists on electronic storage means, such as a CD-Rom for example, is used in connection with a computer and reservoir production data to provide an output that may be displayed or printed;

FIG. 4 shows illustrates a more detailed construction of the production data processing system including data inputs communicating with a system bus;

DETAILED DESCRIPTION

The invention of this application petroleum reservoir fully incorporates a complete (from reservoir to wellhead) production systems analysis approach for the evaluation of petroleum reservoir production performance, in conjunction with rigorous analytic reservoir inflow performance models for a variety of well types and reservoir outer boundary conditions and drainage area shapes. Further, the invention uses industry accepted production analysis techniques such as material balance, decline curve analysis, and non-linear minimization procedures to obtain estimates of well and reservoir properties. The determined well and formation properties are then used to predict the future well and reservoir production performance.

An implemented "best indicator" logic in the analysis system provides the analysis results of the various industry accepted reservoir production analysis techniques. Further, it also indicates to the user which analysis has provided the most reliable estimate of each parameter, based on the limitations and constraints of each of the analyses and whether or not the production data set satisfies the criteria for the validity of these analyses.

Full implementation of a generic statistical analysis procedure for analyzing field-recorded production data is provided to minimize or eliminate the effects of outlier points in the data. This facilitates the implementation of the production analysis system in an automated production analysis procedure. The statistical procedures used in the analysis system include maximum-likelihood (robust) estimation, Fast Fourier Transform smoothing, and other statistical correlation procedures for reducing the effects of outlier data points. "Outlier" data points refers to observed data points that do not follow the general production behavior of the system. The deviation of the actual production data from the expected production decline behavior may be the result of measurement errors or incorrect model selections.

Figure 1:
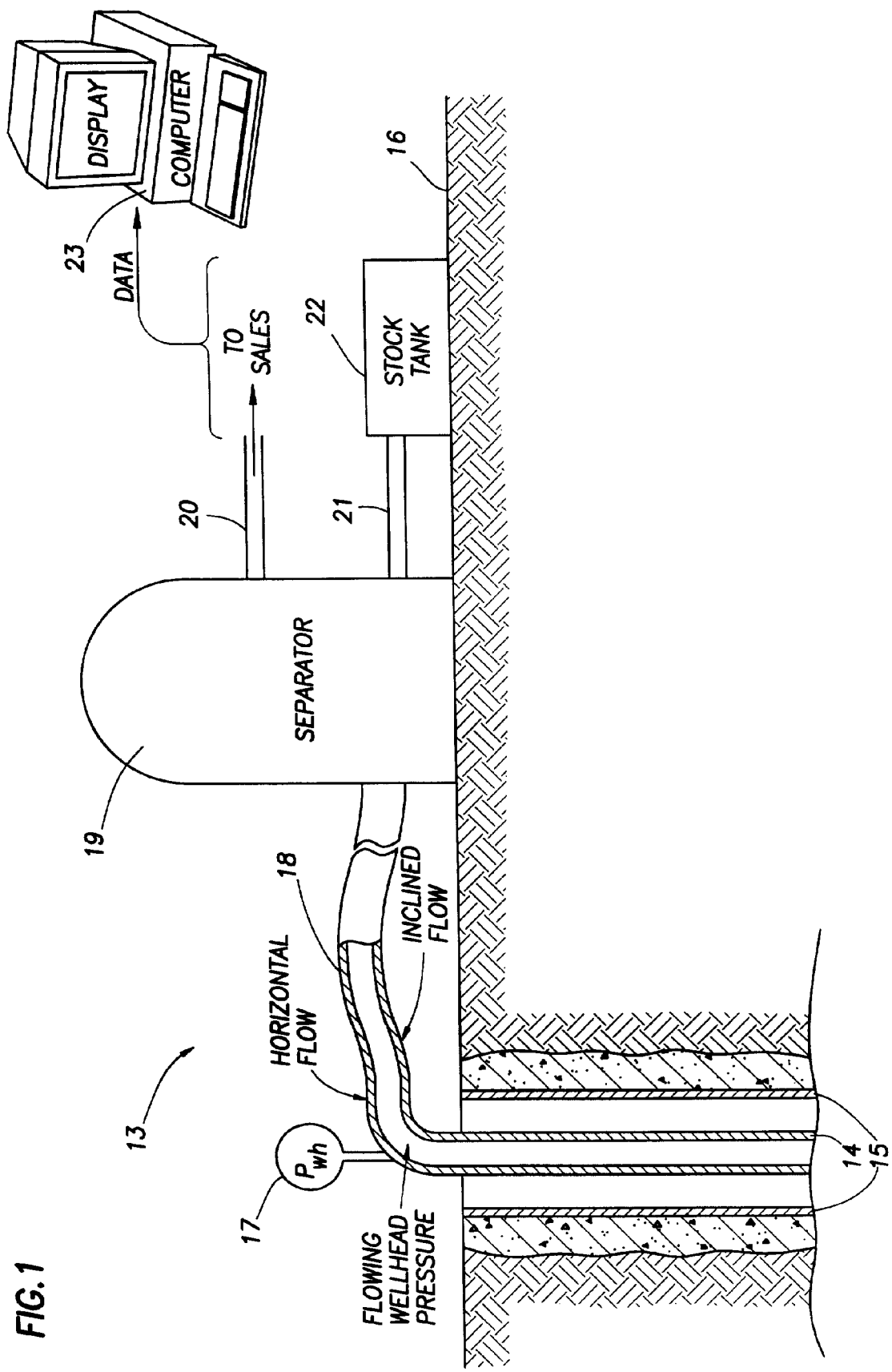
FIG. 1 shows a typical arrangement of a wellbore with associated equipment, with data collection being provided to a computer in accordance with the invention.

Referring now to the Figures, FIG. 1 provides an overview of the production analysis system 13 having a production tubing 14 within a casing 15. The wellbore extends up to the ground surface 16, and a flowing wellhead pressure is measured by a wellhead pressure gauge 17. Production piping 18 carries oil and gas to a separator 19, which separates oil and gas. Gas moves along gas line 20, to be sold into a pipeline, while oil moves along oil line 21 to a stock tank 22. Data representing amounts of oil and/or gas produced is provided to a computer 23 for display, printing, or recordation.

Figure 2:
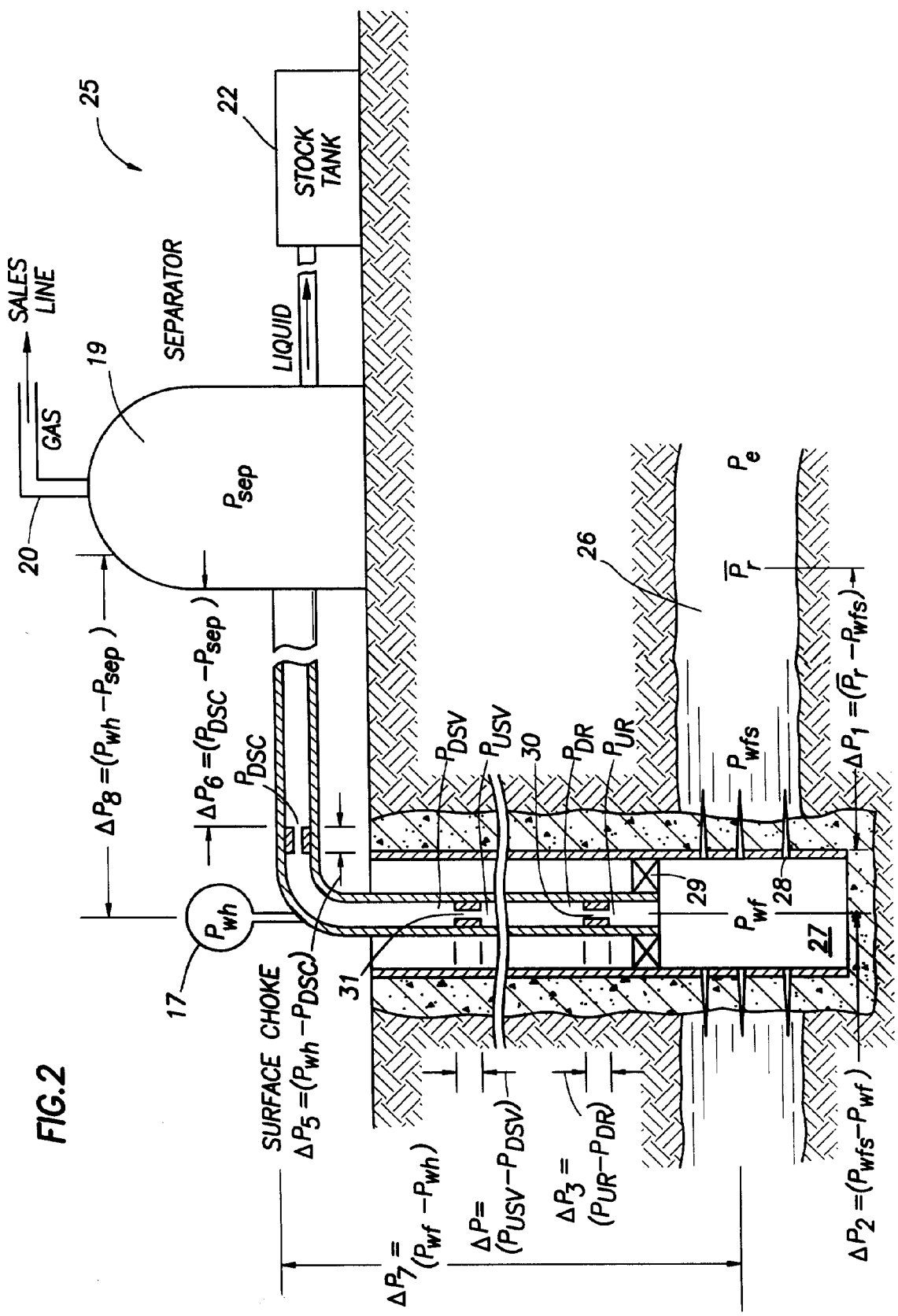
FIG. 2 is a detailed diagram showing pressure values as used in nodal analysis methods.

FIG. 2 shows the procedure for taking pressure point measurements for nodal analysis solutions. In that Figure, pressure loss diagram 25 shows the overall process, which involves several pressure points. In that Figure, reservoir 26 is traversed by a wellbore 27, the wellbore having perforations 28. Packer 29 is evident between the production tubing and the casing. Restriction 30 is a point at which flow is restricted, as well as restriction 31.

In FIG. 2, the pressure values represented are typical values used in nodal analysis procedures. As recognized by persons of skill in the art, these values are as follows:

$\Delta P_1 = P_r - P_{wfs}$ = Loss in Porous Medium
$\Delta P_2 = P_{wfs} - P_{wf}$ = Loss Across Completion
$\Delta P_3 = P_{UR} - P_{DR}$ = Loss Across Restriction
$\Delta P_4 = P_{USV} - P_{DSV}$ = Loss Across Safety Valve
$\Delta P_5 = P_{wh} - P_{DSC}$ = Loss Across Surface Choke
$\Delta P_6 = P_{DSC} - P_{sep}$ = Loss In Flowline
$\Delta P_7 = P_{wf} - P_{wh}$ = Total Loss in Tubing
$\Delta P_8 = P_{wh} - P_{sep}$ = Total Loss in Flowline Wellhead pressure gauge 17 records the pressure in the wellhead, $P_{wh}$, just prior to the surface choke. The separator 19, gas line 20, and stock tank 22 are seen as in FIG. 1.

FIG. 3 shows one embodiment of the invention in which a best indicator technique is used. A CD-ROM 36 (or floppy disk) containing software is loaded into a computer for communication with the computer processor. The software is capable of calculating values representing variations in physical properties of a well and processing that data to determine the most reliable estimates of formation or well parameters. Data is provided to the computer 37 representing the production behavior of a reservoir or a well, and the data is combined with the software to solve algorithms which yield results that are used to optimize well production. The results may be displayed on monitor 38, or printed to a hard copy on printer 39.

In FIG. 4, the various data points are shown as they are provided to the system bus of the computer. The rate or volume of oil or gas produced, fluid properties measured at the surface of the ground, and separator conditions including wellhead production flowing pressures and temperatures are provided to the system bus 32. System bus 32 communicates with processor 33, recorder 34, and software 50. The software is that which resides on the magnetic storage means, such as CD-ROM 36 or floppy disk.

Figure 5:
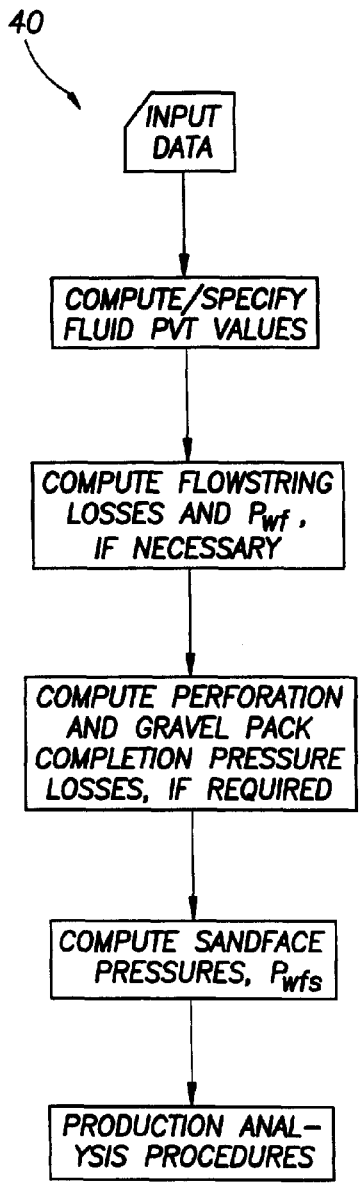
FIG. 5 reveals a production analysis flow diagram.

A production analysis flow diagram is seen in FIG. 5. Input data is provided to compute and specify fluid pressure volume, and temperature values (PVT values). Then flowstring losses are computed, and $P_{wf}$ is computed, if necessary. $P_{wf}$ is the bottom hole flowing pressure at the bottom of the wellbore. Then, perforation and gravel pack completion pressure losses are computed, along with sandface pressures, and production analysis procedures are then applied to achieve a complete production systems analysis of the observed production performance, with the appropriate estimates of the well and formation properties.

Figure 6:
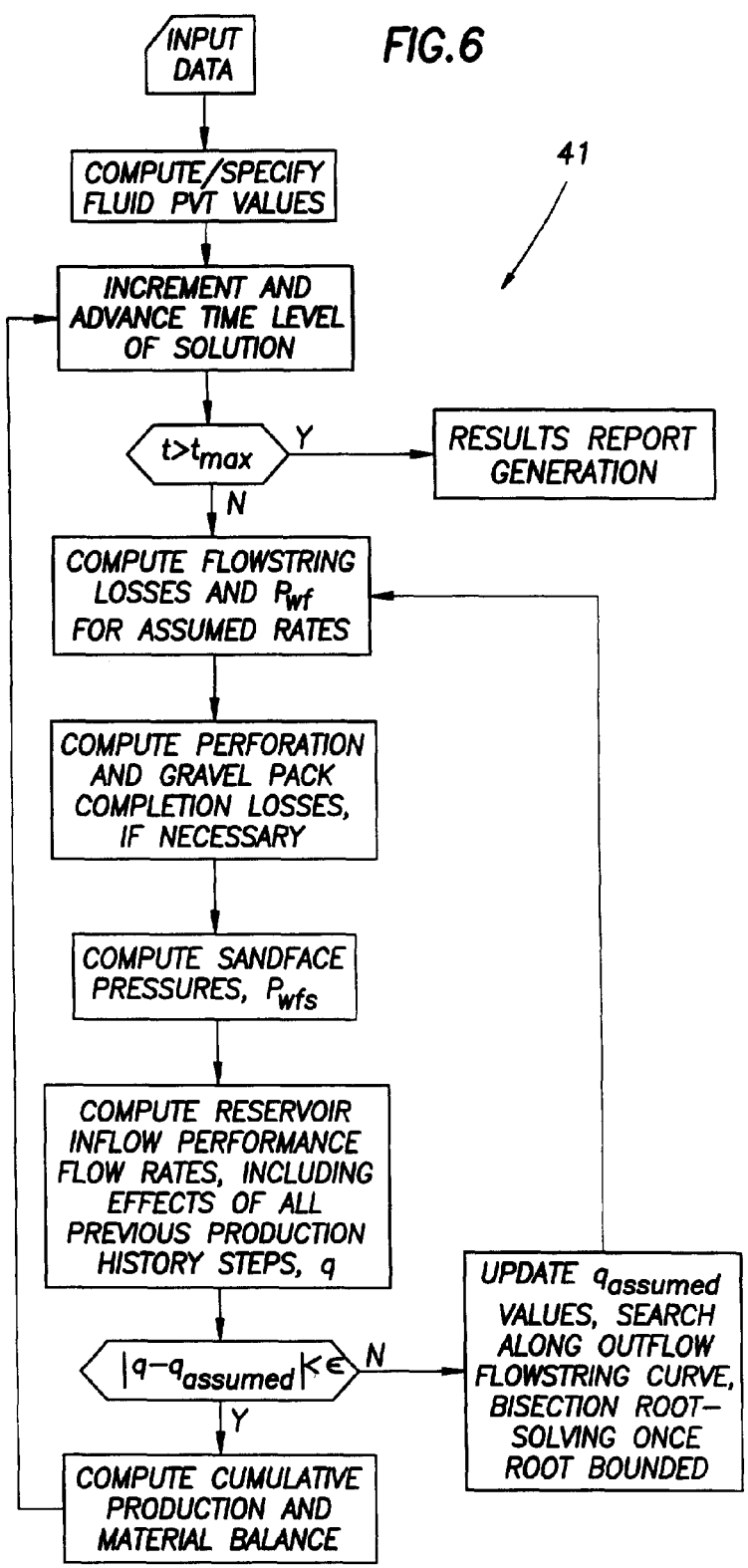
FIG. 6 is a production prediction flow diagram.

In FIG. 6, a production prediction flow diagram is set forth in which PVT values are computed, and then the time level and/or time level increment is advanced. If t (the production time level corresponding to each of the production data points) is greater than $t_{max}$, then results are reported. If not, then flowstring losses are computed for assumed rates, including completion losses. Sandface pressures are computed as are the reservoir inflow performance flowrates, which include the super position-in-time effects of the previous production history on the production performance at each time level.

Figure 7:
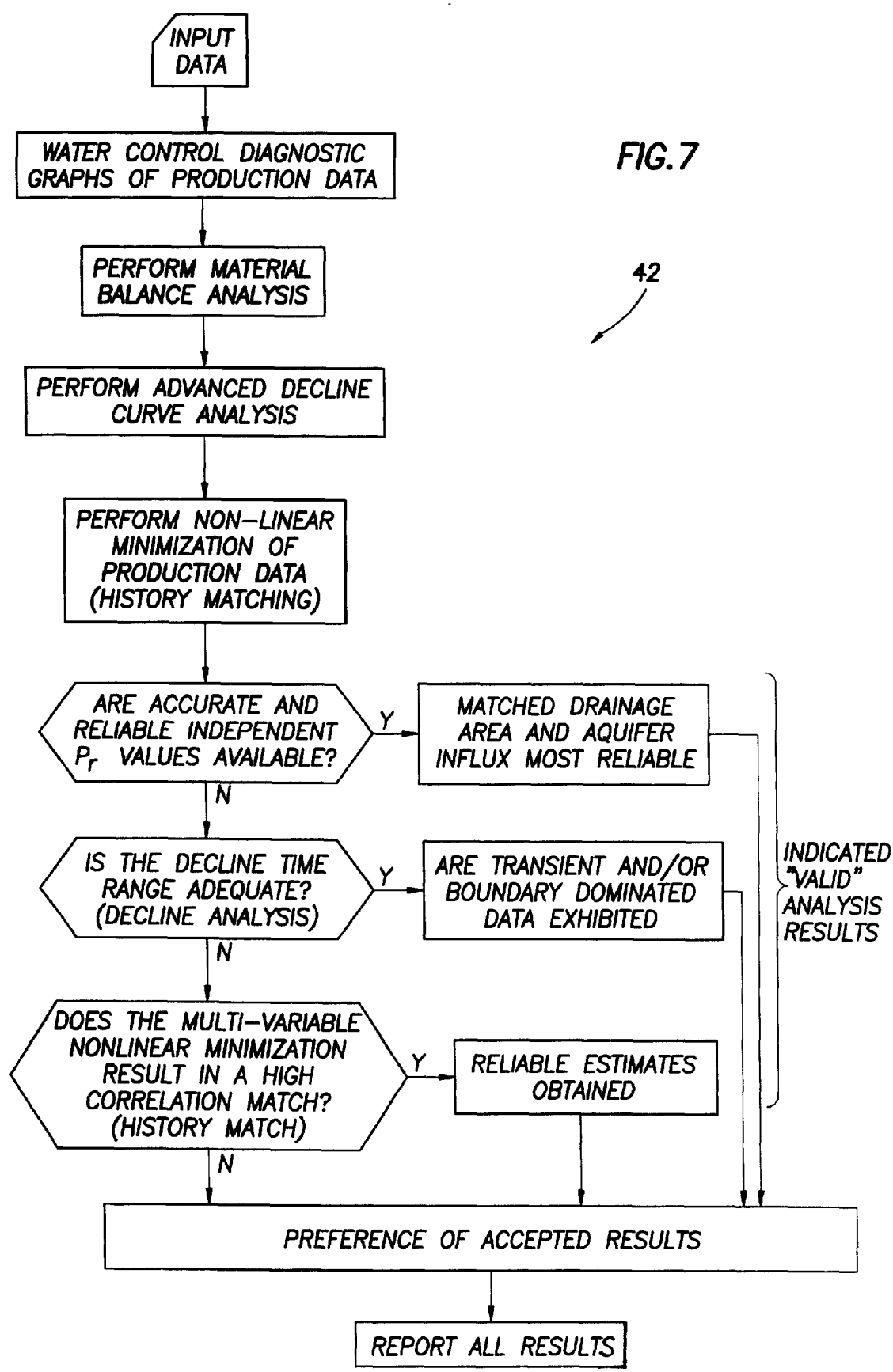
FIG. 7 shows the best indicator logic procedure of this invention.

The best indicator logic procedure is shown in FIG. 7. Input data is provided, and water control diagnostic graphs of production data are used to identify if any evidence of influx is exhibited in the data. Then material balance is performed to determine the drainage area of the reservoir. The pore volume, aquifer influx, and current fluids in place, including average pressure level, are computed. Then, advanced decline curve analysis is performed using selected well model and outer boundary conditions. Manual or automatching procedures can be used. Next, nonlinear minimization of production data with a selected well model can be performed. Inner boundary conditions are specified in production data as either the bottom hole flowing pressures or flow rates, as well as the response function which is given by the cumulative production or bottom hole flowing pressures, respectively.

In the next step, the analysis turns to the question of whether or not accurate and reliable $P_r$ (average reservoir pressure) values are available. If "yes", then matched drainage area and aquifer influx are deemed the most reliable measures of the data. If "no", then the issue is whether or not the decline time range is adequate (i.e. the decline analysis). If "yes", then the decline analysis is the best indicator of the decline exponent, and reliable estimates can be obtained when the match is achieved.

If the answer to the previous question was "no", then the next issue is whether or not the multi-variable nonlinear minimization results in a high correlation match, or history match. If yes, then reliable estimates are obtained. If "no", then the preference of accepted results has been achieved. The "yes" answer to the inquiries at the bottom of FIG. 7 indicates an indicated "valid" analysis result.

Figure 8:
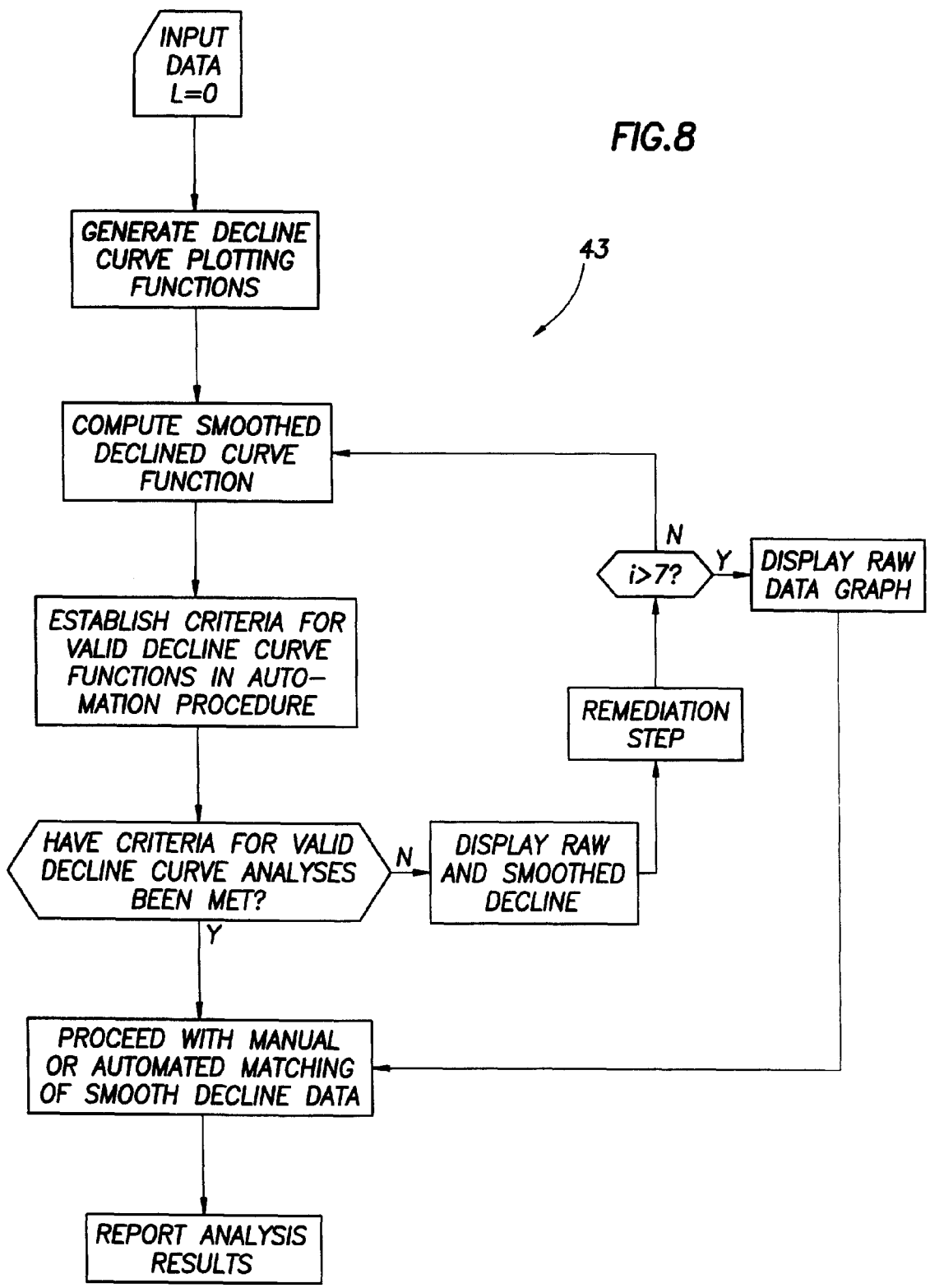
FIG. 8 is a flow diagram of the automated minimization procedure used to establish the effects of outliers (outlying data points) in decline analysis procedures.
Figure 11:
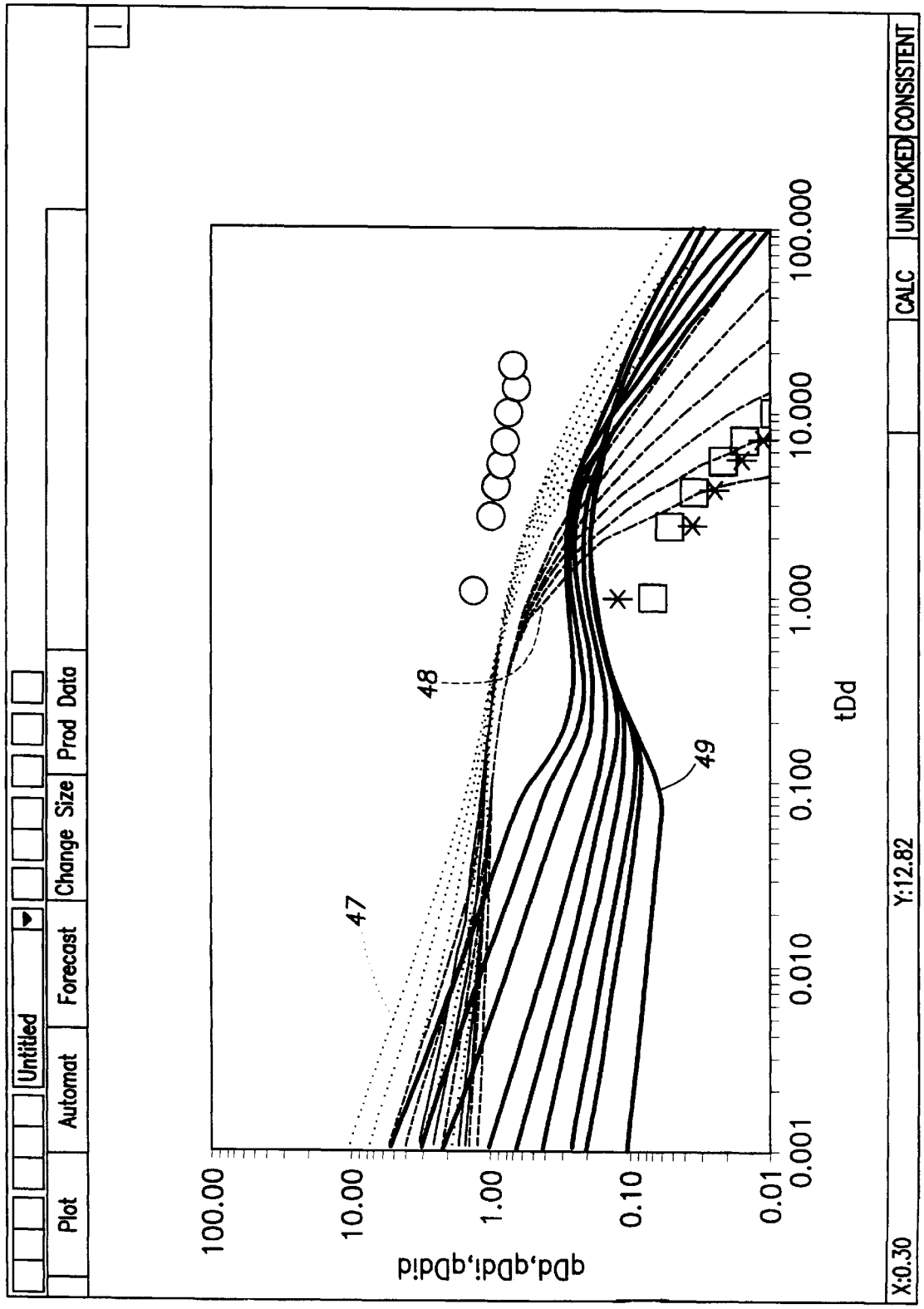
FIG. 11 is an illustration of an enlarged decline curve analysis plot showing the three sets of curves available for viewing or printing by one using this invention.

FIG. 8 provides an automated minimization of the effects of outlier data points in decline analysis. Input data is provided to generate a decline curve plotting function $q/\Delta p$, integral, and derivative functions. This is the raw data option, as seen in FIG. 11.

Then, a smoothed decline curve may be computed. The default used is the maximum likelihood estimation with double exponential probability density function. The user has the option of selecting other probability density functions such as Lorentzian, Normal, Andrew's Sine, or Tukey's Biweight, functions which are known to those of skill in the art. Also, the user can perform reduction of outlier effects manually by selecting FFT smoothing or deleting selected points from the analysis.

The criteria for valid decline curve functions in these automation procedures are: (1) the integral function curve must be monotonically decreasing in the transient regime, and (2) smoothed decline curve points must result in a derivative function in the transient regime that obeys this type of function and integral function behavior.

The next issue is whether the criteria for the valid decline curve analyses has been met. If not, then the raw and smoothed decline are displayed, followed by a remediation step. This may be repeated as many as 7 times.

If the criteria has been met, then the software will proceed with manual or automated matching of smooth decline data, and report analysis results.

The indexing of i is accomplished as below:

| Index (i) | Option | Probability Density Function |
| --- | --- | --- |
| 0 | Raw data plot | — |
| 1 | M-estimate | Double exponential |
| 2 | M-estimate | Lorentzian |
| 3 | M-estimate | Normal |
| 4 | M-estimate | Andrew's Sine |
| 5 | M-estimate | Tukey's Biweight |
| 6 | FFT | — |
| 7 | Least Squares | — |
| 8 | Delete Squares | — |
| 9 | Delete Outliers | — |

Figure 9:
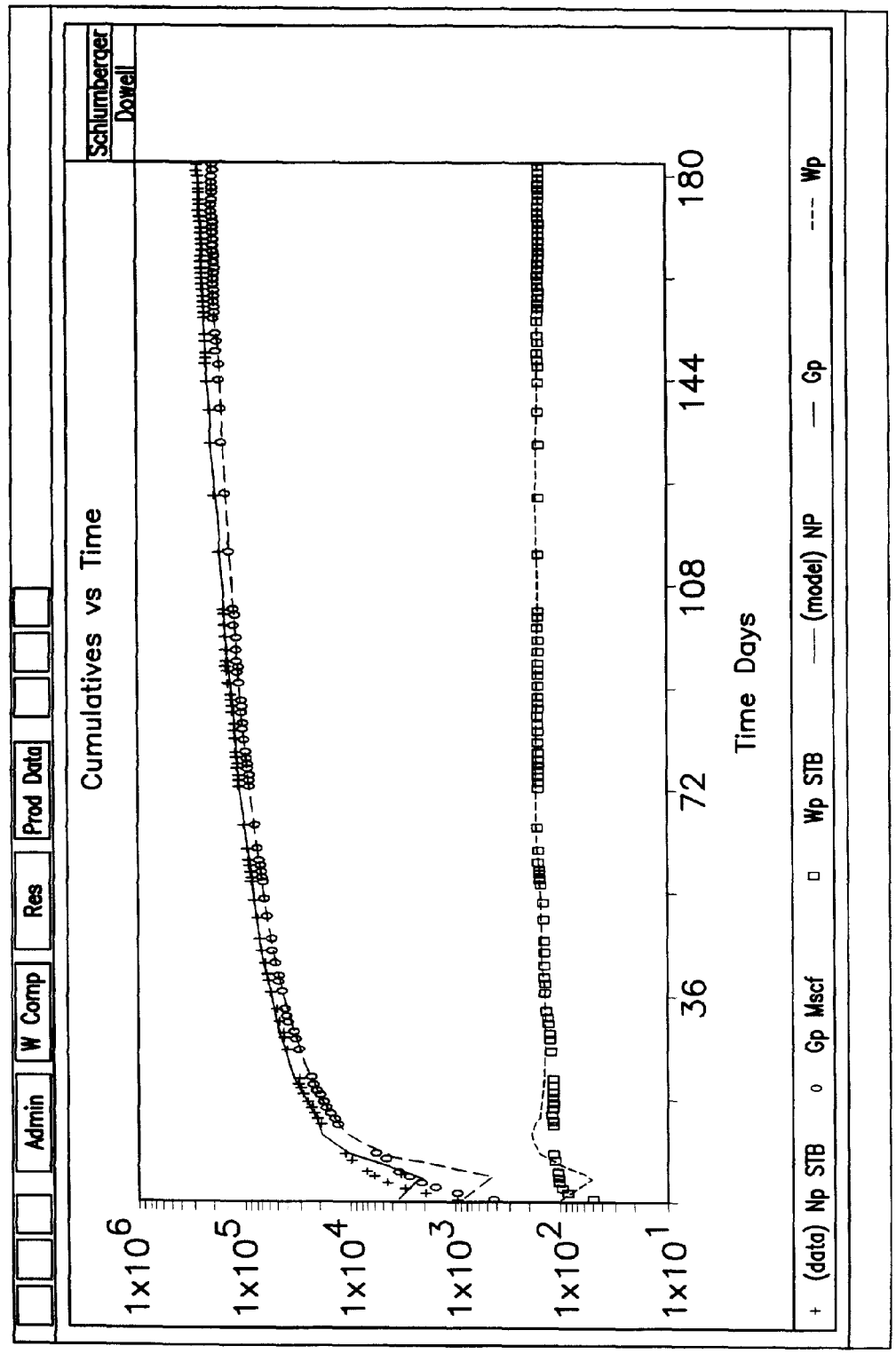
FIG. 9 shows a computer screen, which is displaying the history matching curve showing cumulative production versus time.
Figure 10:
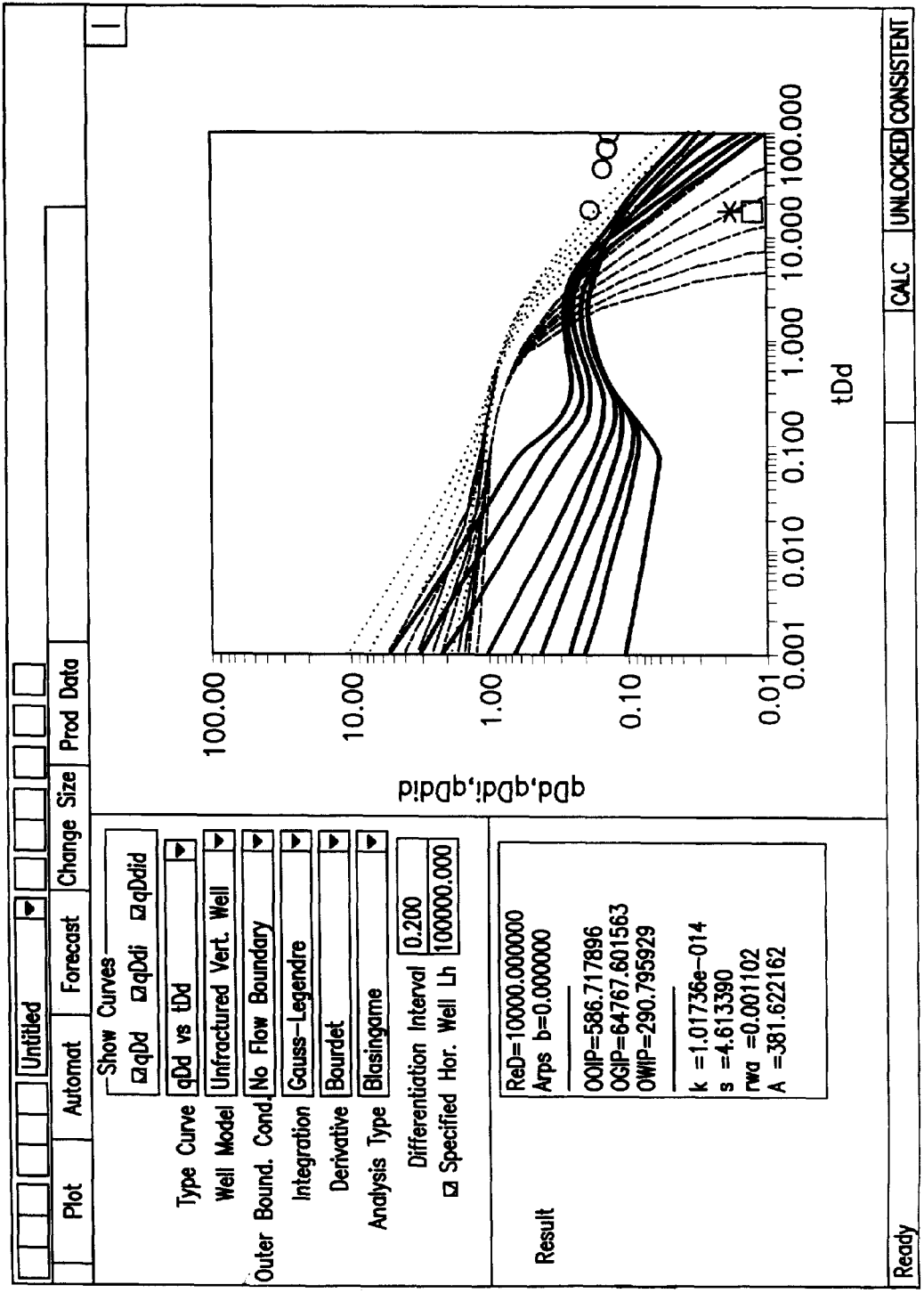
FIG. 10 depicts a computer screen display of the graphical decline curve analysis plot used in the present invention.

In FIG. 9, a history matching procedure is shown in which the cumulative production is plotted against the production time in days. The data points (symbols) in this figure are the actual data measured from the well. The solid or dashed curves are the corresponding simulated system response for the specified inner boundary condition values at each time level. The actual and simulated cumulative production values as a function of time are presented for the oil, gas, and water phases. FIG. 10 shows the graphical decline curve analysis plot 45 would appear to a user on his or her display, with the options in the upper left of the screen. Variables that may be selected by the user include well model, outer boundary condition, integration type, derivative type, analysis type, and others. The curves appear on the right of the Figure, showing three sets of curves, qDd, qDdi, and qDdid, corresponding to the dimensionless decline flow rate, flow rate integral, and flow rate integral derivative functions respectively. The variable t$\Delta$d is the dimensionless decline time function. Also, included on that graph are the corresponding dimensional data plotting functions of pressure drop normalized flow rate functions (q/$\Delta$P), the flow rate integral function, and its corresponding derivative function values. The dimensional data and the characteristic dimensionless reference decline curve functions are used to perform a best-fit graphical matching procedure to obtain estimates of the formation and well properties.

In FIG. 11, an enlarged decline curve analysis is shown, including the plots of qDh, qDdi, and qDdid versus tDd. A similar decline analysis graph can also be generated where the decline functions are evaluated as a function of the cumulative production function (NpDd).

Integral plot 47, flow rate function plot 48, and derivative function values plot 49 are shown.

The objective in the graphical decline analysis matching procedure is to simultaneously match the measured data function values (flow rate, integral, and derivative functions) on the characteristic reference decline curve sets to identify the decline curve set as well as the vertical and horizontal position of the match point. These results are used with the relationships between the dimensional and dimensionless decline analysis variables to obtain estimates of the well and formation properties.

The automated decline curve analysis procedure uses a form of combinatorial minimization (form of simulated annealing) to obtain the optimum correlation of production data with a catalog of decline curve analysis solutions. The automation of the decline analysis matching procedure has been incorporated into the system of this invention so that an update of the production data analysis can be performed automatically as new production data points are obtained and added to the data set.

Graphical Decline Analysis

The graphical decline analysis module employs the theoretical basis of the advanced decline curve analysis procedure and includes an automated interpretation method for all the well models. The graphical decline analysis is seen in FIGS. 10 and 11, previously described.

All well models available in the software permit the outer boundaries to be modeled as closed (no flow) or constant pressure outer boundaries. The vertical unfractured well model can also be modeled with either a step or ramp rate boundary flux model. Pressure drop normalized flow rate functions and integral and derivative functions are used as the fundamental plotting functions. See FIG. 10. The module allows the user to shift curves to obtain the coordinates that agree with each other as well as to add the flow rate integral and flow rate integral derivative functions to aid in the matching procedures.

Most field recorded production data has noise. Noise is caused by data acquisition and record-keeping practices. Using this invention, statistical analyses and a set of five different types of probability functions are used to automatically smooth the field data. Statistical techniques as well as automated decline analysis are used for minimizing the effects of outliers.

A production forecast function using the decline curve analysis is accessible by a simple selection as seen at the top of FIG. 11. This forecast button allows you to make a forecast with the matching results either to a future time level, average reservoir pressure level, or flow rate.

In brine or oil reservoir analyses, a total flow rate function is used to consider the total liquid production from the well, including the sum of the oil and brine liquid flow rates. In gas reservoirs, an equivalent wet gas total flow rate is calculated in which the condensate and produced water are combined in the estimates of total wellstream flow rates. The pseudocritical properties of the gas phase in gas reservoir analyses are based on a wet gas phase made up of the produced free gas and condensate production using the wellstream gas recombination procedure.

Material Balance/Empirical Decline

The material balance/empirical decline analysis module facilitates the determination of original oil in place and gas in place so that a performance prediction can be made. It allows reliable estimates of the reservoir pore volume, initial reservoir pressure level and average rate of aquifer influx depending upon whether or not the reservoir is comprised of oil or gas.

If the analysis is based upon an oil reservoir, a sensitivity analysis can be performed by varying the drainage area, initial pressure, or aquifer influx rate to determine how much the production data agrees with the parameters. Production forecasting is possible based upon the match from the sensitivity analysis. Once the estimates of the parameter values are obtained, the future production performance and recovery of the well are estimated using conventional rate decline relationships, with extrapolation to either an average reservoir pressure or time level.

If the analysis is based upon a gas reservoir, a sensitivity analysis is performed. Once a match is made, and the parameters determined, the model can be used to extrapolate the previous production behavior to estimate future recovery and performance.

This model allows the calculation of estimates of prevailing reservoir pressure at any given time in the well production history based strictly upon estimates of the drainage area volume in the system as well as production data. Reliability of interpretation is determined by measured estimates of pressure over the history of the reservoir. Drainage area or pore volume may be determined, as well as drive mechanism and initial pressure, independent of any other parameters.

History Match

The history matching module is capable of obtaining estimates of the formation in the well properties available for each particular well model such as fracture length, fracture conductivity, formation permeability, near well steady state skin effect or whatever parameters that are being inverted to obtain a match with the data set.

The rate or pressure transient solution is generated in this module. The bottomhole pressures can be modeled to provide rate response in the event that an operator has daily recorded production rates, but very few pressure points. It is preferable to analyze the production data by using the method which results in the data with the highest density being used as the inner boundary condition values for the inversion process.

This module allows an operator to provide the cumulative production history of the well as the response function, and then specify the bottomhole pressures (inner boundary condition values). LaPlace space analytic pressure-transient solutions of the difficulty equation for the various well types and boundary conditions are specified to define the well model that is used to simulate the well performance.

The catalog of well models permits the use of different boundary conditions, such as infinite acting, no flow, or constant pressure boundaries. To generate the specified pressure (Dirichlet) inner boundary condition, the response function would be the match on the cumulative production from the well. To generate the Neumann inner boundary condition solution (computed bottomhole flowing pressures), the inner boundary condition values would be the flow rate data, and the response function matched is bottom hole pressure.

Production Systems Analysis

This production analysis system facilitates the characterization of the formation and well properties in a reservoir on a well-by-well basis using the actual production data of the wells in that reservoir. The system includes a complete production systems analysis approach for obtaining estimates of the sandface flowing or shut-in pressures. By "sandface", we mean the inner boundary condition (pressure) just outside of the wellbore and completion (gravel pack and perforations). The sand face inner boundary condition pressure is that pressure that governs the reservoir inflow performance and production. The sandface pressures can be derived using measured surface flowing or shut-in pressures, the well flow-string configuration, and the perforation and gravel pack completions, if applicable. The wellbore outflow correlations that are available in the model are Hagedorn and Brown, Duns and Ros, Orkiszewski, Beggs and Brill, and Cullender and Smith. The perforation completion pressure loss relationships of Brown, Karakas and Tariq, and McLeod also are available in the system. The correlations available in the system for estimation of gravel pack completion pressure losses are the McLeod, Cooke, Saucier, Tenneco Resin Pack, and Firoozabadi and Katz non-Darcy flow correlations, as referenced by Brown.

The reservoir inflow performance models provided in the this system catalog are complete Laplace space analytic pressure transient solutions for the various well model and outer boundary conditions specified. The well models available include finite-wellbore unfractured wells, finite-conductivity vertical fractures, horizontal wells, horizontal wells intersecting one or more orthogonal finite-conductivity vertical fractures, multiple finite-conductivity vertical fracture and horizontal well radials, and a radial composite reservoir model. The outer boundary conditions that are available for these well models are infinite-acting, no-flow (closed boundary), and constant pressure outer boundaries. The reservoir drainage area shapes available in the system for the history match and production forecasts are rectangular and cylindrical.

Production Data Handling Capability

This invention includes the functionality of integrating specified fluid phase flow rates (injection, production, or shutin) to obtain the cumulative production of each fluid phase (oil, gas, and water), or differentiation of the specified input cumulative production values of each of the fluid phases to obtain the production or injection flow rates. This invention has the capability of importing separate production rate/cumulative and production pressure data sets and merging the two sets together to obtain a composite set that can be used in the analyses.

The bottomhole flowing or shut-in pressures can be estimated from recorded wellhead pressures and flow rates using the flow-string pressure loss calculation procedures listed previously. The superposition-in-time evaluation procedure used for incorporating the effects of the previous production history steps on each successive point in time can be specified using either a stepwise or linear connection between points.

The end result of the production data handling and processing functions typically is to obtain a composite set of consistent data upon which the production data analyses are performed. This invention has the capability of filling in missing values in the input data by generation of the composite data set vectors of wellhead flowing pressures, wellhead flowing temperatures, and bottomhole flowing pressures using linear interpolation between specified non-zero values. For the bottomhole flowing pressures, if all values for this parameter are specified or reset to zero, the interpolation is performed first on the wellhead flowing pressures and temperatures (if necessary), and then the bottomhole pressures are evaluated with the specified wellbore flow-string calculation procedure.

Reservoir Fluid Pressure-Volume-Temperature (PVT) Relationships

This invention uses tabular pressure, volume temperature ("PVT") function values for evaluation of the reservoir inflow performance. Each of the reservoir layers are assumed to be at a uniform average initial temperature and pressure, which can be specified as different in each layer. The temperature in each layer is assumed to remain constant with respect to time (isothermal conditions assumed), however the pore pressures in each layer can varying arbitrarily with respect to time. The user can specify a tabular set of laboratory determined PVT values for each of the fluid phases, or the PVT table values can be estimated using a relatively extensive set of empirical correlations available in the system.

While the fluid PVT properties used in this invention for the reservoir production analyses are for isothermal conditions using fluid PVT tables, the evaluation of the wellbore flow-string pressure losses are performed using the specified fluid PVT correlations directly since the evaluation procedure requires calculation over the entire flow-string length, with non-isothermal conditions.

The correlations available in this invention for estimation of the reservoir fluid properties are defaulted for the gas and water phases since the PVT properties for these fluids can be generally well correlated with gas composition or specific gravity and brine salinity, respectively. The correlations used for estimation of the gas pseudocritical properties when the gas molar composition is specified are the mixing rules proposed by Kay for gas viscosity evaluation, and by Stewart-Burkhardt-Voo for the Z-factor, compressibility, and density function evaluations. If the gas composition has not been specified, the gas pseudocritical properties are estimated with the gas specific gravity and non-hydrocarbon gas components using the empirical correlations of Standing for use in the gas viscosity evaluations and by Sutton for the Z-factor, compressibility, and density function evaluations.

The real gas law deviation (Z) factor, compressibility, and density are evaluated using the 11 constant generalized Starling-Carnahan equation-of-state developed by Dranchuk and Abou-Kassem. The gas viscosity is evaluated using the correlations of Carr et al. However, the correlations of Lee are also available for evaluation of the gas viscosity.

The brine saturation pressure can be either specified as input or can be estimated using the correlation of Keenan et al. The brine formation volume factor is generally evaluated in this invention using the correlations of Ostermann, but can also be evaluated in this invention with the correlations of McCain. The solution gas/water ratio is by default estimated using a proprietary set of correlations that reproduce the data of Culberson and McKetta, however the correlations reported by McCain may also be made available for the estimation of brine solution gas/water ratios. The undersaturated brine compressibility is by default evaluated using the correlation reported by Osif, but the correlation reported by Meehan can also be made available in the system for estimating undersaturated brine compressibility.

The saturated brine compressibility is directly computed from the brine formation volume factor and solution gas/water relationships. Brine viscosities are evaluated in this invention using the correlations reported by Ostermann, but the correlations of Meehan and McCain can also be made available for the estimation of brine viscosities.

Since the physical properties of reservoir oils vary significantly, due to differences in composition, in situ conditions, and geographical region of the world, a relatively large set of empirical correlations are included in this invention so that the user can specify a set of correlations that will result in oil physical property values that more closely resemble the properties of a particular reservoir of interest. As a benefit to the user, a set of regional defaults have been implemented in this invention that can be used to quickly select a set of correlations to use that have been reported in the literature to provide reasonably reliable oil physical properties in a given geographic region. These regional defaults of the correlations have been developed from published articles that reported comparisons of the better correlations to use in a given geographical area, or have been determined from the geographical regions from which the oil samples used in the development of the PVT correlations themselves were obtained.

There are eleven regional selection options available in this invention for specifying a default set of oil PVT correlations, including United States Gulf Coast, Alaska, California, Mid-Continent United States, North Sea, Saudi Arabia, Western Canada, United Arab Emirates, Nigeria, Columbia, and a general set of correlations that have been developed from fluid samples obtained from various parts of the globe.

Other sets of default correlation sets may be added to the regional default list as these they are needed, and are within the scope of this invention. The user also has the option to simply select each individual oil physical property correlation desired. An option is also available in this invention to specify whether the crude oil is classified as either a black or volatile oil. In the case of volatile oils, the correlations reported by Glaso are used.

The correlations available in this invention for estimating the oil bubble point pressure or solution gas/oil ratio at the bubble point pressure are those reported by Standing, Lasater, Vasquez and Beggs, Glaso, Al-Marhoun, Petrosky and Farshad, Asgarpour, Dokla and Osman, Obomanu, Farshad, and Kartoatmodjo and Schmidt.

The oil formation volume factor can be estimated using the correlations of Standing, Vasquez and Beggs, Glaso, Al-Marhoun, Petrosky and Farshad, Asgarpour, Dokla and Osman, Obomanu, Farshad, and Kartoatmodjo and Schmidt. Dead oil viscosities can be estimated using the correlations of Beal, Beggs and Robinson, Glaso, and Egbogah. Undersaturated oil viscosities can be estimated using the correlations of Beal, Vasquez and Beggs, and Khan.

Saturated oil viscosities can be computed using the correlations reported by Chew and Connally, Beggs and Robinson, and Khan. Undersaturated oil isothermal compressibility can be estimated using the correlations reported by Calhoun, Trube, Vasquez and Beggs, and Petrosky and Farshad. Saturated oil compressibilities are computed directly from the oil formation volume factor and solution gas/oil ratio relationships specified.

Methodology of Outlier Remediation

This invention has been developed to provide the production or reservoir engineer a production data analysis system that will perform most of the industry accepted, valid analyses of production data available to obtain estimates of reservoir and well properties, and to enable the engineer to obtain reliable and accurate predictions of the future performance of a well. Further, using the invention, one may evaluate the economic viability of various production enhancement scenarios that are being considered. One additional benefit of the system is that many of the analysis procedures can be automated and the production data analysis system can be directly tied to a production data acquisition system. Therefore, most all of the new methodology that has been developed in this work is related to the implementation of automated analyses of the production data.

In general, almost all field-recorded production data have noise. "Noise" refers generally to scattered observed data points that do not follow the expected production trend. Some of the noise is directly attributable to the accuracy and frequency of the data acquisition and record-keeping, while other factors contributing to the noise observed in production data may be due to the response of the well or field resulting from an unanticipated or possibly unreported alteration in the production scenario. By default, this invention uses the maximum-likelihood (robust estimation) method with a double exponential probability density function to minimize the effects of outlier points in the production data on the decline analysis results.

The expert user may find further advantage in using some of the more specific statistical techniques available in this invention for minimizing the effects of outlier points (noise or erroneous data points) in the data. The user has the option of selecting one of several different types of outlier minimization procedures, including various types of other maximum-likelihood methods with other types of probability density functions such as Lorentzian, Normal, Andrew's Sine, or Tukey's Biweight.

Note that Andrew's Sine probability density function with an empirical correlation coefficient of 2.1 corresponds to a normal probability density distribution of errors, as well as does a value of 6.0 in Tukey's Biweight probability density function. If a simple filtering of the data is required or desired, Fast Fourier Transforms (FFT's) are available in this invention to simply smooth the dependent variable (response function, q/delta P). The user can use FFT's to provide various levels of smoothing, depending on how many neighboring points are included for the smoothing of each point. A value of the number of neighboring points included equal to zero results in no smoothing at all, while a value of the number of neighboring points corresponding to greater than or equal to half of the total number of points removes essentially all character from the shape of the curves.

One feature of the implementation of the maximum-likelihood estimation method employed in this invention is that the robust estimation is not limited to simple linear functions, as determined in the conventional Least Absolute Deviation method. This invention uses a form of Simplex non-linear minimization to determine the coefficients of higher order fitting polynomials, in which the polynomial is used to describe the correlation between the q/delta P plotting functions and the cumulative production function. Outliers are minimized in this way by forcing a polynomial fit through the data plotting function using a generalized Least Absolute Deviation merit function for the determination of the polynomial coefficients.

Automated Decline Curve Analysis Matching

The advanced decline analysis procedure used in this invention follows directly from work reported by Doublet, Blasingame and coworkers. There are several significant differences between the advanced decline analysis procedure implemented in this invention and the Doublet, Blasingame and coworkers analysis procedure. The same fundamental plotting functions are used in both analysis procedures (pressure normalized flow rate functions, integral, and derivative functions), except (1) in this invention the proper scaling function for the unfractured well abscissa and ordinate axes instead of the Fetkovitch type scaling function used by Doublet, (2) constant pressure outer boundary condition solutions have been added to the invention for finite-wellbore unfractured wells, infinite and finite-conductivity fractures, and infinite-conductivity horizontal wells, (3) closed (noflow) boundary decline analysis curves added to this invention for the previously described well models, (4) an automated decline curve matching procedure using combinatorial minimization (simulated annealing) to obtain a minimal residual match with the tabulated family of decline curves, (5) production forecasting using the decline curve analysis matched solution to either a future time level, flow rate, or average reservoir pressure level, (6) cylindrically bounded reservoir solutions are used throughout the decline analysis procedure for consistency, and (7) multiphase flow analysis functions are employed to somewhat account for multiple fluids produced from the well or reservoir.

In brine or oil reservoir analyses, a total flow rate function is used to consider the total liquid production from the well, comprised of a sum of the oil and brine liquid flow rates. In gas reservoirs, an equivalent wet gas total flow rate is estimated using the method reported by Jennings, in which the condensate and produced water are combined in the estimates of total wellstream flow rates. The pseudocritical properties of the gas phase in gas reservoir analyses are based on a wet gas phase comprised of the produced free gas and condensate production using the wellstream gas recombination procedure developed by Gold.

Comparative Economic Analyses

This invention includes a computational component in which the user can perform a comparative economic analysis of the viability of various production enhancement procedures on wells, whether it be fracturing, acidization, drilling additional laterals, or reperforation to improve the wells performance. This invention includes the appropriate reservoir and completion systems analysis models to properly consider each of these scenarios and evaluate the economic return that can be obtained for each.

The economic analysis computations follow those presented by Thompson and Wright, and include the industry accepted economic indices (yardsticks) of Discounted Cash Flow Rate of Return (DCFROR), Appreciation of Equity Rate of Return (AOEROR), Return on Investment (ROI), Net Present Value (NPV), payout time with and without interest, and NPV and cumulative discounted cash flow per investment ratios.

FURTHER DETAILED DESCRIPTION

This invention may use several software models, some examples of which are shown below:

Gas Reservoir Material Balance Analysis Model
I. Description
The general gas reservoir material balance analysis program is a reservoir engineering tool that can be used to quickly evaluate the performance of a gas reservoir to obtain reliable estimates of the reservoir pore volume, initial reservoir pressure level if unknown, and average rate of aquifer water influx. The model can be used to perform a sensitivity analysis of the reservoir production performance. Once a satisfactory match of the reservoir performance has been made and the key reservoir parameters have been determined, the model can be used to extrapolate the previous production behavior to estimate future recovery and performance.

II. Functionality
  A. Gas Reservoir Material Balance Analysis
  B. Sensitivity Analysis
    1. Drainage area
    2. Initial reservoir pressure
    3. Aquifer water influx rate
  C. Production Forecast—Extrapolation
    1. Automatic nonlinear regression
    2. Extrapolation to either a pressure or time level.

III. Mathematical Model
  A. Material Balance Analysis
    1. Ramagost-Farshad[1] analysis $$\frac{P_r}{Z}\left(1 - \frac{(P_i - P_r)(S_w c_w + c_f)}{S_g}\right) = \frac{P_i}{Z_i}\left(1 - \frac{G_p}{G}\right)$$

2. Modified material balance analysis $$\frac{P_r}{Z}\left(1 - \frac{(P_i - P_r)(S_w c_w + S_o c_o + c_f)}{S_g} - \frac{P_i(W_e I - W_p)B_w T_{sc}}{Z_i T P_{sc} G}\right) = \frac{P_i}{Z_i}\left(1 - \frac{G_p}{G}\right)$$

Modifications
      Aquifer influx
      Formation water production
      Residual oil (condensate) expansion
  B. Applications
    Dry gas reservoirs
    Wet gas (retrograde condensate) reservoirs
    Normally and geopressured reservoirs
    Aquifer influx and water production
  C. Reservoir Fluid Physical Properties
    1. Gas properties
      a. Z factor, $B_g$ and $c_g$
        Dranchuk-Abou Kassem[2]
      b. Gas viscosity
        Lee-Gonzales-Eakin[3]
        Carr-Kobayaski-Burrows[4]
    2. Residual oil properties—oil compressibility
      a. Regions—general defaults by geographical regions of world
      b. Western Canada formation specific correlations
      c. Black or volatile oil correlations[5-14]
    3. Formation brine—aquifer water properties
      a. Brine saturation pressure—Keenan[15]
      b. Formation volume factor—HP[16]
      c. Compressibility—Osif[17]
  D. Gas Equivalent of Condensate Production[18]

$$q_t = q_g + \frac{133.316 \gamma_{oST} q_o}{M_o}$$

where $$M_0 = \frac{42.43 \gamma_{oST}}{1.008 - \gamma_{oST}} \quad \text{molecular weight } ST \text{ condensate}$$

$$\gamma_{oST} = \frac{141.5}{131.5 + °API} \quad \text{specific gravity of condensate}$$

E. Pseudocritical Properties of Wet Gas[19]

$$P_c = 756.8 - 131 \gamma_w - 3.6 \gamma_w^2 \quad (\text{psia})$$

$$T_c = 169.2 + 349.5 \gamma_w - 74 \gamma_w^2 \quad (°R)$$

$$\gamma_w = \frac{R_1 \gamma_1 + 4602 \gamma_{oST} + G_{pa}}{R_1 + V_{eq}}$$

$$R_1 = \frac{1000 q_g}{q_o}\left(\frac{scf}{STB}\right) \quad \text{primary seperator gas/condensate ratio}$$

Two Stage Separation System (Primary Separator and Stock Tank)

Additional gas production vented at stock tank[20] ($G_{pa}$), scf/STB $$G_{pa} = \beta_1(P_{S_1} - 14.65)^{\beta_2} \gamma_1^{\beta_3} \gamma_{oST}^{\beta_4} T_{S_1}^{\beta_5}$$

$\beta_1 = 1.459927681$
$\beta_2 = 1.339396906$
$\beta_3 = 7.094340191$
$\beta_4 = 1.14355547$
$\beta_5 = 0.934459908$ Vapor equivalent of primary separator liquid ($V_{eq}$), scf/STB $$V_{eq} = \beta_0 + \beta_1 P_{S_1}^{\beta_2} \gamma_1^{\beta_3} \gamma_{oST}^{\beta_4} T_{S_1}^{\beta_5}$$

$\beta_0 = 635.5296004$
$\beta_1 = 0.3618207$
$\beta_2 = 1.0543524$
$\beta_3 = 5.0830512$
$\beta_4 = 1.5812423$
$\beta_5 = -0.7913009$ Three Stage Separation System (Primary and Secondary Separators and Stock Tank)

Additional gas production vented at stock tank ($G_{pa}$), scf/STB $$G_{pa} = \beta_1(P_{S_1} - 14.65)^{\beta_2} \gamma_1^{\beta_3} \gamma_{oST}^{\beta_4} T_{S_1}^{\beta_5} T_{S_2}^{\beta_6}$$

$\beta_1 = 2.992221644$
$\beta_2 = 0.970496523$
$\beta_3 = 6.804907227$
$\beta_4 = 1.079157777$
$\beta_5 = -1.196046908$
$\beta_6 = 0.553669886$ Vapor equivalent of primary separator liquid ($V_{eq}$), scf/STB $$V_{eq} = \beta_0 + \beta_1 P_{S_1}^{\beta_2} \gamma_1^{\beta_3} \gamma_{oST}^{\beta_4} T_{S_1}^{\beta_5} T_{S_2}^{\beta_6}$$

$\beta_0 = 535.9163255$
$\beta_1 = 2.6230958$
$\beta_2 = 0.7931832$
$\beta_3 = 4.6612017$
$\beta_4 = 1.2094037$
$\beta_5 = -0.8491146$
$\beta_6 = 0.2698689$ F. Rate Decline—Cumulative Production Extrapolation Fetkovitch[21] gas reservoir rate decline models 1. Exponential decline rate (n=0.5, b=0)

$$q_g(t) = q_{gi} e^{-\left(\frac{q_{gi}}{G}\right)t}$$

$$G_p(t) = G\left[1 - e^{-\left(\frac{q_{gi}}{G}\right)t}\right]$$

Logarithmic transformation results in regression relationship $$\ln(G - G_p(t)) = \ln(G) - \frac{q_{gi}}{G}t$$

This is an equation of a straight line for $\ln(G-G_p(t))$ versus t.

2. Nonexponential decline rate (includes harmonic decline, n=∞, b=1)

$$(0.5 < n \leq \infty)$$

$$q_g(t) = \frac{q_{gi}}{\left[(2n-1)\left(\frac{q_{gi}}{G}\right)t + 1\right]^{\frac{2n}{2n+1}}}$$

$$G_p(t) = G\left(1 - \left[1 + (2n-1)\left(\frac{q_{gi}}{G}\right)t\right]^{\frac{1}{1-2n}}\right)$$

The regression relationship is obtained from the cumulative production relationship.

$$\left[1 - \frac{G_p(t)}{G}\right]^{1-2n} = 1 + (2n-1)\left(\frac{q_{gi}}{G}\right)t$$

Reciprocal of decline rate exponent (b)

$$b = \frac{2n-1}{2n}$$

Initial decline rate, $D_i$ $(1/D \text{ or } 1/mo)$ $$D_i = \frac{q_{gi}}{G}$$

IV. Model Data Input
  A. Time Units—Production Data
    1. Time (in days) and flow rates (Mscf/D and STB/D)
    2. Time (in days) and cumulative production values (MMscf and STB)
    3. Time (in months) and flow rates (Mscf/mo and STB/mo)
    4. Time (in months) and cumulative production values (MMscf and STB)
  B. Formation Water Compressibility
    1. Use program correlations
    2. User specified $c_w$ value
  C. Reservoir Oil Compressibility
    1. Use program correlations
    2. User specified $c_o$
  D. Formation Pore Compressibility
    1. Use program correlations
    2. User specified $c_f$ value
  E. Estimated Reservoir Properties
    $P_i$, T, A, h, $\phi$, $S_{wi}$, $S_{oi}$
  F. Surface Measured Conditions and Variable Values
    $\gamma_1$, $Y_{H2S}$, $Y_{CO2}$, $Y_{N2}$, $\gamma_{oST}$, S, separation system ($T_{sep}$, $P_{sep}$)
  G. Production Data—Measured Reservoir Pressures
    t, $q_g$, $q_o$, $q_w$
    t, $G_p$, $N_p$, $W_p$
    t, $\bar{P}_r$
  H. Sensitivity Analysis Selections
    A, $P_i$, $W_e$
  I. Extrapolation Selections
    t, $\bar{P}_r$
V. Model Results
  A. Graphs $q_g$, $q_o$, $q_w$ versus t
$G_p$, $N_p$, $W_p$ versus t
$P_r/Z$ versus $Q_{peq}$
$Q_{peq}$ versus t
$P_r$ versus t
$P_r/Z$ versus $Q_{peq}$   verification ⎫ only available when
$P_r$ versus t                verification ⎭ measured $P_r$ values specified B. Output Files
    ASCII plot files for other graphic applications
    ASCII computed results file for printing
VI. Cited References for the Gas Reservoir Material Reservoir Balance Analysis Model (References Cited Herein are Incorporated by Reference)
  1. Ramagost, B. P. amd Farshad, F. F.: "P/Z Abnormally Pressured Gas Reservoirs," paper SPE 10125 presented at the 1981 SPE Annual Technical Conference and Exhibition, San Antonio, Tex., October 5–7.
  2. Dranchuk, P. M. and Abou-Kassem, J. H.: "Calculation of Z Factors for Natural Gases Using Equations of State," *JCPT* (July–September 1975) 34–36.
  3. Lee, A. L., Gonzales, M. H., and Eakin, B. E.: "The Viscosity of Natural Gases," *JPT* (August 1966) 997–1000; *Trans.* AIME, 237.
  4. Carr, N. L., Kobayashi, R., and Burrows, D. B.: "Viscosity of Hydrocarbon Gases Under Pressure," *Trans.* AIME, 201, 264–272.
  5. Standing, M. B.: "A Pressure-Volume-Temperature Correlation for Mixtures of California Oils and Gases," *Drill. And Prod. Prac.,* API (1947) 275–287.
  6. Lasater, J. A.: "Bubble Point Pressure Correlation," *Trans.,* AIME, 213 (1958) 379–381.
  7. Vazquez, M. E. and Beggs, H. D.: "Correlations for Fluid Physical Property Prediction," *JPT* (June 1980) 968–970.
  8. Glaso, O.: "Generalized Pressure-Volume-Temperature Correlations," *JPT* (May 1980) 785–795.
  9. Al-Marhoun, M. A.: "PVT Correlations for Middle East Crude Oils," *JPT* (May 1988) 650–666.
  10. Petrosky, G. E. Jr. And Farshad, F. F.: "Pressure-Volume-Temperature Correlations for Gulf of Mexico Crude Oils," paper SPE 26644 presented at the 1993 SPE Annual Technical Conference and Exhibition, Houston, Tex. (October 3–6).
  11. Sutton, R. P. and Farshad, F. F.: "Evaluation of Empirically Derived PVT Properties for Gulf of Mexico Crude Oils," paper SPE 13172 presented at the 1984 SPE Annual Technical Conference and Exhibition, Houston, Tex. (September 16–19).
  12. Asgarpout, S., McLauchlin, L., Wong, D., and Cheung, V.: "Pressure-Volume-Temperature Correlations for Western Canadian Gases and Oils," *JCPT,* 28, No. 4 (July–August 1989) 103–111.
  13. Calhoun, J. C. Jr.: *Fundamentals of Reservoir Engineering,* University of Oklahoma Press, Norman, Okla. (1947), 35.
  14. Trube, A. S.: "Compressibility of Undersaturated Hydrocarbon Reservoir Fluids," *Trans.,* AIME, 210 (1957) 341–344.

15. Keenan, J. H., Keyes, F. G., Hill, P. G., and Moore, J. G.: *Thermodynamic Properties of Water Including Vapor, Liquid and Solid Phases,* John Wiley and Sons Inc., New York, N.Y. (1969).
16. Hewlett-Packard: "Petroleum Fluids Pac-Handbook," Hewlett-Packard, Corvallis, Oreg. (1982) 102–103.
17. Osif, T. L.: "The Effects of Salt, Gas, Temperature, and Pressure on the Compressibility of Water," paper SPE 13174 presented at the 1984 SPE Annual Technical Conference and Exhibition, Houston, Tex. (September 16–19).
18. Jennings, J. W., Poe, B. D. Jr., Gold, D. K., Ryan, R. J., and Oden, R. D.: "Deliverability Testing of Natural Gas Wells," Texas A&M University (August 1989).
19. Sutton, R. P.: "Compressibility Factors for High Molecular Weight Reservoir Gases," paper SPE 14265 presented at the 1985 SPE Annual Technical Conference and Exhibition, Las Vegas (September 22–25).
20. Gold, D. K., McCain, W. D. Jr., and Jennings, J. W.: "An Improved Method for the Determination of the Reservoir Gas Gravity for Retrograde Gases," paper SPE 17310 presented at the 1988 Permian Basin Oil and Gas Recovery Conference, Midland, Tex. (March 10–11).
21. Fetkovitch, M. J.: "Decline Curve Analysis Using Type Curves," *JPT* (1980).

VII. Nomenclature Used in Mathematical Relationships Shown in this Specification A=reservoir drainage area, acres
b=reciprocal of rate decline exponent
$B_g$=gas formation volume factor, rcf/scf
$B_w$=formation water formation volume factor, rb/STB
$C_f$=formation pore compressibility, 1/psia
$C_o$=residual oil compressibility, 1/psia
$C_w$=formation water compressibility, 1/psia
$D_i$=initial decline rate, 1/mo or 1/day
G=initial gas in place in system, MMscf
$G_p$=cumulative gas produced, MMscf
$G_{pa}$=additional gas production vented at stock tank, scf/STB
h=reservoir net pay thickness, ft
$M_o$=molecular weight of stock tank liquid, lbm/lbm-mole
n=decline rate parameter
$N_p$=cumulative ST condensate production, STB
$P_c$=pseudocritical pressure, psia
$P_i$=initial reservoir pressure, psia
$P_r$=average reservoir pressure, psia
$P_{sc}$=standard condition pressure, psia
$P_{s1}$=primary separator operating pressure, psia
$q_g$=gas flow rate, Mscf/D or Mscf/mo
$q_{gi}$=initial wet gas flow rate, Mscf/D or Mscf/mo
$q_o$=condensate flow rate, STB/D or STB/mo
$q_t$=wet gas flow rate, Mscf/D or Mscf/mo
$q_w$=formation water production rate, STB/D or STB/mo
$Q_{peq}$=wet gas equivalent cumulative production, MMscf
$R_1$=primary separator producing gas/liquid ratio, scf/STB
S=formation water salinity, ppm
$S_g$=average reservoir gas saturation, fraction PV
$S_o$=average reservoir condensate saturation, fraction PV
$S_{oi}$=initial reservoir condensate saturation, fraction PV
$S_w$=average reservoir water saturation, fraction PV
$S_{wi}$=initial reservoir water saturation, fraction PV
t=time, days or months
T=average reservoir temperature, °R
$T_c$=pseudocritical temperature, °R
$T_{sc}$=standard condition temperature, °R
$T_{s1}$=primary separator operating temperature, °F.
$T_{s2}$=secondary separator operating temperature, °F.
$V_{eq}$=vapor equivalent of primary separator liquid, scf/STB
$W_e$=average aquifer water influx rate, STB/D
$W_p$=cumulative water produced, STB
$Y_{co2}$=carbon dioxide content in gas, mole fraction
$Y_{H2s}$=hydrogen sulfide content in gas, mole fraction
$Y_{N2}$=nitrogen content in gas, mole fraction
Z=gas law deviation factor
$Z_i$=initial gas Z factor
Symbols
°API=stock tank condensate gravity, °API
$\phi$=average reservoir effective porosity, fraction BV
$\beta_0-\beta_6$=constants in Veq and retrograde gas gravity relationship
$\gamma_{oST}$=stock tank condensate specific gravity (water=1)
$\gamma_w$=well stream gas specific gravity (air=1)
$\gamma_1$=primary separator gas specific gravity (air=1)

Oil Reservoir Material Balance Analysis Model

I. Description

The general oil reservoir material balance analysis model can be used to evaluate the reservoir production behavior of a well in an oil reservoir to obtain reliable estimates of the initial reservoir pressure, reservoir pore volume, and average aquifer water influx rate. Sensitivity analyses can be performed with the model to evaluate the effects of drainage area, initial pore pressure, and water influx rate on the reservoir pressure history of the reservoir. Once acceptable estimates of the unknown parameter values are obtained, the future production performance and recovery of the well may be estimated using conventional rate decline relationships, with extrapolation to either an average reservoir pressure or time level.

II. Functionality
   A. Three-phase Material Balance
   B. Sensitivity Analyses
      1. Drainage area
      2. Initial pore pressure
      3. Aquifer water influx rate
   C. Production Forecast—Extrapolation
      1. Automatic nonlinear regression
      2. Extrapolation to either a pressure or time level
III. Mathematical Models
   A. General Schilthuis Material Balance[1]

$$N_p[B_o + (R_p - R_{so})B_g] =$$

$$N_{pi}B_{oi}\left\{[(B_o - B_{oi}) + (R_{soi} - R_{so})B_g]/B_{oi} + m\left(\frac{B_g}{B_{gi}} - 1\right) + \frac{(1+m)(S_{wi}C_w + c_f)(P_i - P_r)}{1 - S_{wi}}\right\} + B_w(W_e t - W_p)$$

Components
   Aquifer influx
   Formation water production
   Gas cap expansion
B. Applications
   Solution gas drive reservoirs
   Oil reservoirs with a gas cap
   Oil reservoirs with aquifer influx and water production
C. Reservoir Fluid Physical Properties
   1. Oil properties
      a. Regions—general defaults by geographical regions of world
      b. Western Canada formation specific correlations[2]
      c. Black or volatile oil correlations[3-15]

2. Gas properties
   a. Z factor, $B_g$ and $c_g$
      Dranchuk-Abou Kassem[16]
   b. Gas viscosity
      Lee-Gonzales-Eakin[17]
      Carr-Kobayashi-Burrows[18]
3. Formation brine—aquifer water properties
   a. Brine saturation pressure—Keenan[19]
   b. Formation volume factor—HP[20]
   c. Solution gas-water ratio—Culberson-McKetta[21]
   d. Viscosity-Ostermann, et al.[22]
   e. Compressibility—Osif[23]
D. Rate Decline—Cumulative Production Extrapolation
Fetkovitch[24] oil reservoir rate decline models
$P_r$ versus $N_p$ is linear relationship (undersaturated reservoir behavior generally tends to low this relationship)

$$q_o(t) = \frac{q_{oi}}{\left[(2n)\left(\frac{q_{oi}}{N_{pi}}\right)t+1\right]^{\frac{2n+1}{2n}}}$$

This relationship corresponds directly with the Arps relationship $$q_o(t) = \frac{q_{oi}}{(1+bD_i t)^{\frac{1}{b}}}$$

where $$b = \frac{2n}{2n+1}$$

and $$D_i = \frac{q_{oi}}{(1-b)N_{pi}}$$

Integration of the rate decline relationship with respect to time results in the relationship for estimating the cumulative oil production as a function of time.

$$N_p(t) = N_{pi}\left[1 - (1+bD_i t)^{-\left(\frac{1-b}{b}\right)}\right]$$

Two special (limiting) cases must be considered when evaluating the cumulative production relationship above. These are of course the exponential (b=0) and harmonic (b=1) rate decline relationships. For the exponential (b=0) decline relationship;

$$q_o(t) = q_{oi} e^{-D_i t}$$

The corresponding cumulative production relationship is given by $$N_p(t) = \frac{q_{oi}}{D_i}[1 - e^{-D_i t}]$$

or $$N_p(t) = N_{pi}\left[1 - e^{\frac{q_{oi} t}{N_{pi}}}\right]$$

The initial decline rate ($D_i$) for an exponential decline rate is readily determined from the cumulative production relationship as $t \to \infty$.

$$N_p(t) = N_{pi}$$

limit $\to \infty$ $$D_i = \frac{q_{oi}}{N_{pi}}$$

The other special case that must be considered is that for a harmonic (b=1) rate decline $$q_o(t) = \frac{q_{oi}}{1+D_i t}$$

Integration of the harmonic rate decline relationship results in the cumulative production relationship $$N_p(t) = \frac{q_{oi}}{D_i}\ln(1+D_i t)$$

The initial decline rate in this case must be evaluated numerically with regression of the measured field data.

2. $P_r^2$ versus $N_p$ is linear relationship (nonprorated reservoir production may follow this relationship)

$$q_o(t) = \frac{q_{oi}}{\left(1 + \frac{q_{oi} t}{2N_{pi}}\right)^{2n+1}}$$

or $$q_o(t) = \frac{q_{oi}}{(1+bD_i t)^{\frac{1}{b}}}$$

where $$b = \frac{1}{2n+1}$$

and $$D_i = \frac{(2n+1)q_{oi}}{2N_{pi}}$$

Integration of the rate decline relationship above results in the cumulative production relationship $$N_p(t) = \frac{N_{pi}}{n}\left[1 - \frac{1}{\left(1 + \frac{q_{oi} t}{2N_{pi}}\right)^{2n}}\right]$$

or $$N_p(t) = \frac{2bN_{pi}}{1-b}\left[1 - \frac{1}{(1+bD_i t)^{\frac{1-b}{b}}}\right]$$

Two special cases must also be considered as well, the exponential and harmonic rate decline cases. For an exponential decline rate (n=∞, b=0) the rate decline and cumulative production relationship are considered to be the same as those given previously for the case where $P_r$ versus $N_p$ is a linear relationship even though the exact limiting expression cannot readily be developed in an analytic form.

$$q_o(t) = q_{oi}e^{-D_i t} = q_{oi}e^{-\frac{q_{oi}}{N_{pi}}t}$$

$$N_p(t) = N_{pi}(1 - e^{-D_i t}) = N_{pi}\left(1 - e^{-\frac{q_{oi}t}{N_{pi}}}\right)$$

where $$D_i = \frac{q_{oi}}{N_{pi}}$$

The harmonic rate decline ($n=0$, $b=1$) and cumulative production relationships are given by the following:

$$q_o(t) = \frac{q_{oi}}{1 + \frac{q_{oi}t}{2N_{pi}}}$$

$$N_p(t) = 2N_{pi}\ln\left(1 + \frac{q_{oi}t}{2N_{pi}}\right)$$

where $$D_i = \frac{q_{oi}}{2N_{pi}}$$

IV. Model Data Input
  A. Time Units—Production Data
    1. Time (in days) and flow rates (STB/D and Mscf/D)
    2. Time (in days) and cumulative production values (STB and MMscf)
    3. Time (in months) and flow rates (STB/mo and Mscf/mo)
    4. Time (in months) and cumulative production values (STB and MMscf)
  B. Formation Water Physical Properties
  $P_{sat}$, $B_w$, $R_{sw}$, $C_w$
    1. Use program correlations
    2. User specified values
  C. Reservoir Oil Physical Properties
  $P_b$, $B_o$, $R_{so}$, $c_o$ (oil type, geographical region, Canadian formation, and acid gas corrections)
    1. Use program correlations
    2. User specified values
  D. Reservoir Gas Physical Properties
  Z, $B_g$, $c_g$ (Dranchuk-Abou Kassem[16])
  E. Formation Pore Compressibility ($c_f$)
    1. Use program correlations (lithology dependent)
    2. User specified $c_f$ value
  F. Estimated Reservoir Properties
  $P_i$, T, A, h, $\phi$, $S_{wi}$, $S_{oi}$
  G. Surface Measured Conditions and Variable Values
  $\gamma_1$, $Y_{H2S}$, $Y_{co2}$, $Y_{n2}$, $Y_{oST}$, S, separation system ($T_{sep}$, $P_{sep}$)
  H. Production Data—Measured Reservoir Pressures
  t, $q_g$, $q_o$, $q_w$
  t, $G_p$, $N_p$, $W_p$
  t, $\overline{P}_r$
  I. Sensitivity Analysis Selections
  A, $P_i$, $W_e$
  J. Extrapolation Selections
  t, $\overline{P}_r$ VI. References Set Forth Below are Incorporated by Reference into this Disclosure 1. Dake, L. P.: *Fundamentals of Reservoir Engineering*, Elsevier Scientific Publishing Co., New York, N.Y., 1978, 73–102.
2. Asgarpour, S., McLauchlin, L., Wong, D., and Cheung, V.: "Pressure-Volume-Temperature Correlations for Western Canadian Gases and Oils," *JCPT*, 28, No. 4 (July–August 1989), 103–111.
3. Standing, M. B.: "A Pressure-Volume-Temperature Correlation for Mixtures of California Oils and Gases," Drill. And Prod. Prac., API (1947) 275–287.
4. Lasater, J. A.: Bubble Point Pressure Correlation," *Trans.*, AIME, 213 (1958) 379–381.
5. Vazquez, M. E. and Beggs, H. D.: "Correlations for Fluid Physical Property Prediction," *JPT* (June 1980) 968–970.
6. Glaso, O.: "Generalized Pressure-Volume-Temperature Correlations," *JPT* (May 1980) 785–795.
7. Al-Marhoun, M. A.: "PVT Correlations for Middle East Crude Oils," *JPT* (May 1988) 650–666.
8. Petrosky, G. E. Jr. And Farshad, F. F.: "Pressure-Volume-Temperature Correlations for Gulf of Mexico Crude Oils," paper SPE 26644 presented at the 1993 SPE Annual Technical Conference and Exhibition, Houston, Tex. (October 3–6).
9. Sutton, R. P. and Farshad, F. F.: "Evaluation of Empirically Derived PVT Properties for Gulf of Mexico Crude Oils," paper SPE 13172 presented at the 1984 SPE Annual Technical Conference and Exhibition, Houston, Tex. (September 16–19).
10. Calhoun, J. C. Jr.: *Fundamentals of Reservoir Engineering*, University of Oklahoma Press, Norman, Okla. (1947), 35.
11. Trube, A. S.: "Compressibility of Undersaturated Hydrocarbon Reservoir Fluids," *Trans.*, AIME, 210, (1957) 341–344.
12. Beal, C.: "The Viscosity of Air, Water, Natural Gas, Crude Oil and Its Associated Gases at Oil Field Temperatures and Pressures," *Oil and Gas Property Evaluation and Reserve Estimates*, SPE Reprint Series, 3, SPE, Dallas, Tex. (1970) 114–127.
13. Chew, J. and Connally, C. A. Jr.: "A Viscosity Correlation for Gas-Saturated Crude Oils," *Trans.*, AIME, 216 (1959) 23–25.
14. Beggs, H. D. and Robinson, J. R.: "Estimating the Viscosity of Crude Oil Systems," *JPT* (September 1975) 1140–1141.
15. Khan, S. A., Al-Marhoun, M. A., Duffuaa, S. O., and Abu-Khamsin, S. A.: "Viscosity Correlations for Saudi Arabian Crude Oils," paper SPE 15720 presented at the 1987 SPE Middle East Oil Show, Manama Bahrain (March 7–10).
16. Dranchuk, P. M. and Abou-Kassem, J. H.: "Calculation of Z Factors for Natural Gases Using Equations of State," *JCPT* (July–September 1975) 34–36.
17. Lee, A. L., Gonzales, M. H., and Eakin, B. E.: "The Viscosity of Natural Gases," *JPT* (August 1966) 997–1000; *Trans.*, AIME, 237.
18. Carr, N. L., Kobayashi, R., and Burrows, D. B.: "Viscosity of Hydrocarbon Gases Under Pressure," *Trans.*, AIME, 201, 264–272.
19. Keenan, J. H., Keyes, F. G., Hill, P. G., and Moore, J. G.: *Thermodynamic Properties of Water Including Vapor, Liquid and Solid Phases*, John Wiley and Sons Inc., New York, N.Y. (1969).

20. Hewlett-Packard: "Petroleum Fluids Pac-Handbook," Hewlett-Packard, Corvallis, Oreg. (1982) 102–103.
21. Culberson, O. L. and McKetta, J. J. Jr.: "Phase Equilibria in Hydrocarbon-Water Systems: III—The Solubility of Methane in Water at Pressures to 10,000 psia, " Trans., AIME, 192 (1951) 223.
22. Ostermann, R. D., Bloori, A., and Dehghani, K.: "The Effect of Dissolved Gas on Reservoir Brine Viscosity," paper SPE 14211 presented at the 1985 SPE Annual Technical Conference and Exhibition, Las Vegas, Nev. (September 22–25).
23. Osif, T. L.: "The Effects of Salt, Gas, Temperature, and Pressure on the Compressibility of Water," paper SPE 13174 presented at the 1984 SPE Annual Technical Conference and Exhibition, Houston, Tex. (September 16–19).
24. Fetkovitch, M. J.: "Decline Curve Analysis Using Type Curves," *JPT* (1980).

VII. Nomenclature

| | |
|---|---|
| A | = reservoir drainage area, acres |
| b | = reciprocal of rate decline exponent |
| $B_g$ | = gas formation volume factor, rb/scf |
| $B_{gi}$ | = initial gas formation volume factor, rb/scf |
| $B_o$ | = oil formation volume factor, rb/STB |
| $B_{oi}$ | = initial oil formation volume factor, rb/STB |
| $B_w$ | = formation water formation volume factor, rb/STB |
| $c_f$ | = formation pore compressibility, 1/psia |
| $c_g$ | = gas compressibility, 1/psia |
| $c_o$ | = residual oil compressibility, 1/psia |
| $c_w$ | = formation water compressibility, 1/psia |
| $D_i$ | = initial decline rate, 1/mo or 1/day |
| G | = initial gas in place in system |
| $G_p$ | = cumulative gas produced, MMscf |
| h | = reservoir net pay thickness, ft |
| m | = ratio of initial gas cap pore volume to initial oil zone pore volume, rb/rb |
| n | = decline rate parameter |
| $N_p$ | = cumulative ST condensate production, STB |
| $N_{pi}$ | = original oil in place in reservoir, STB |
| $P_i$ | = initial reservoir pressure, psia |
| $P_r$ | = average reservoir pressure, psia |
| $P_{sep}$ | = primary separator operating pressure, psia |
| $q_g$ | = gas flow rate, Mscf/D or Mscf/mo |
| $q_o$ | = oil flow rate, STB/D or STB/mo |
| $q_{oi}$ | = initial oil flow rate STB/D or STB/mo |
| $q_w$ | = formation water production rate, STB/D or STB/mo |
| $R_p$ | = cumulative producing gas/oil ratio, scf/STB |
| $R_{so}$ | = solution gas-oil ratio, scf/STB |
| $R_{soi}$ | = initial oil solution gas-oil ratio, scf/STB |
| S | = formation water salinity, ppm |
| $S_g$ | = average reservoir gas saturation, fraction PV |
| $S_o$ | = average reservoir oil saturation, fraction PV |
| $S_{oi}$ | = initial reservoir oil saturation, fraction PV |
| $S_w$ | = average reservoir water saturation, fraction PV |
| $S_{wi}$ | = initial reservoir water saturation, fraction PV |
| t | = time, days or months |
| T | = average reservoir temperature, °R |
| $T_c$ | = pseudocritical temperature, °R |
| $T_{sep}$ | = primary separator operating temperature, ° F. |
| WC | = water cut, % |
| $W_e$ | = average aquifer water influx rate, STB/D |
| $W_p$ | = cumulative water produced, STB |
| $Y_{co2}$ | = carbon dioxide content in gas, mole fraction |
| $Y_{H2s}$ | = hydrogen sulfide content in gas, mole fraction |

Stimulation Treatment Economics Evaluation Model

I. Description

To make a decision on an investment one needs to be able to understand what the economic impact will be on the organization and how it compares to other investments they may make. This program will give the basic measuring sticks of how to evaluate a well stimulation treatment.

The basic ingredients for evaluating an investment are:
1. Cost—cash outflow (investment, financing changes, operating costs, taxes)
2. Revenue—cash inflow (amount of product produced× price per unit, revenue interest)
3. Time and weight of time—when does the cash flow occur and the impact on value it has (amount of time versus production, interest rate, discount rate, price change, fixed cost change).

II. Input

Main Screen

Time units—production data

Select how the production will be input:
  1. As a rate/time (day or month, i.e., bbl/day; Mcf/month at a particular time, i.e., 10 days).
  2. Or as a cumulative at a point in time (day, month, i.e., 1,000 bbl produced at 30 days).

III. Investment

This is dollars spent at time zero
  User Company job ticket
    Amount $ spent usually a variable when comparing various jobs.
  Non-user Company Job ticket
    Amount $ spent in conjunction with the treatment other than user company job ticket. When comparing various treatments usually fixed.
  Interest rate (% year)
    The cost of borrowing money to pay for User Service Company Job ticket and Non-user service company job ticket. (prime +2%~12%.)
  Discount rate (%)
    Can be used two ways:
      1. "Hurdle rate" the minimum amount a company must exceed to make an investment (per year). (Hint ~15%.)
      2. "Inflation rate" the value a $ will drop (per year). (Hint ~7%.)

ADDITIONAL LITERATURE REFERENCES

Hagedorn, A. R. and Brown, K. E., "Experimental Study of Pressure Gradients Occurring During Continuous Two-Phase Flow in Small Diameter Vertical Conduits," *JPT* (April 1965), 475–484.

Duns, H., Jr. And Ros, N. C. J., "Vertical Flow of Gas and Liquid Mixtures in Wells," 6th World Petr. Congress, Sec. 11—paper 22, Frankfurt, Germany.

Orkiszewski, J., "Predicting Two-Phase Pressure Drops in Vertical Pipe," *JPT* (June 1967), 829–838.

Beggs, H. D. and Brill, J. P., "A Study of Two-Phase Flow in Inclined Pipes," *JPT* (May 1973) 607–617.

Cullender, M. H. and Smith, R. V., "Practical Solution for Gas-Flow Equations for Wellsand Pipelineswith Large Temperature Gradients, *Trans.*, AIME 207, 281–287.

*The Technology of Artificial Lift Methods,* K. E. Brown (ed.), 4, PennWell Publishing Co., Tulsa, Okla. (1984) 20–21.

Karakas, M. and Tariq, S., "Semi-Analytical Productivity Models for Perforated Completions," paper SPE 18271, 1988.

McLeod, H. O. Jr., "The Effect of Perforating Conditions on Well Performance," *JPT* (January 1983), 31–39.

Cooke, C. E. Jr., "Conductivity of Fracture Proppants in Multiple Layers," *JPT* (September 1973) 1101–1108; *Trans.*, AIME 255.

Saucier, R. J., "Gravel Pack Design Considerations," paper SPE 4030 presented at the 1972 SPE Annual Technical Conference and Exhibition, October 8–11.

Firoozabadi, A. and Katz, D. L., "An Analysis of High Velocity Gas Flow Through Porous Media," JPT (February 1979) 211–216.

Kay, W. B., "Density of Hydrocarbon Gases and Vapors at High Temperature and Pressure," Ind. Eng. Chem. (September 1936) 1014–1919.

Stewart, W. F., Burkhardt, S. F., and Voo, D., "Prediction of Pseudocritical Parameters for Mixtures," Proc. AIChE Meeting, Kansas City, Mo. (May 18, 1959).

Standing, M. B., Volumetric and Phase Behavior of Oil Field Hydrocarbon Systems, 9$^{th}$ Printing, SPE Dallas Sutton, R. P., "Compressibility Factors for High Molecular Weight Reservoir Gases," paper SPE 14265 presented at the 60$^{th}$ Annual Technical Conference and exhibition, Las Vegas, Nev. (September 22–25, 1985).

Dranchuk, P. M. and Abou-Kassem, J. H., "Calculation of Z Factors for Natural Gases Using Equations of State," JCPT (July–September 1975) 34–36.

Carr, N. L., Kobayashi, R., and Burrows, D. B., "Viscosity of Hydrocarbon Gases Under Pressure," Trans., AIME 201, 264–272.

Lee, A. L., Gonzales, M. H., and Eakin, B. E., "The Viscosity of Natural Gases," JPT (August 1966), 997–1000; Trans., AIME 237.

Keenan, J. H., Keyes, F. G., Hill, P. G., and Moore, J. G., Thermodynamic Properties of Water Including Vapor, Liquid and Solid Phases, John Wiley and Sons, Inc., New York, N.Y. (1969).

Ostermann, R. D., Bloori, A., and Dehghani, K., "The Effect of Dissolved Gas on Reservoir Brine Viscosity," paper SPE 14211 presented at the 60$^{th}$ Annual Technical Conference and Exhibition, Las Vegas, Nev. (Sep. 22–25, 1985). McCain, W. D. Jr., The Properties of Petroleum Fluids, 2$^{nd}$ ed. PennWell Books, Tulsa Okla. (1988).

Culberson, O. L. and McKetta, J. J. Jr., "Phase Equilibriain Hydrocarbon-Water Systems: III.—The Solubility of Methane in Water at Pressures to 10,000 psia," Trans., AIME 192, (1951), 223.

Osif, T. L., "The Effects of Salt, Gas, Temperature, and Pressure on the Compressibility of Water," paper SPE 13174 presented at the 59$^{th}$ Annual Technical Conference and Exhibition, Houston, Tex. (Sep. 16–19, 1984).

Meehan, D. N., "A Correlation for Water Compressibility," Pet. Eng. (November 1980), 125–126.

Meehan, D. N., "Estimating Water Viscosity at Reservoir Conditions, Pet. Eng. (July 1980), 117–118.

Glaso, O., "Generalized Pressure-Volume-Temperature Correlations," JPT (May 1980), 785–795.

Standing, M. B., "A Pressure-Volume-Temperature Correlation for Mixtures of California Oil and Gases," Drill. And Prod. Prac., API (1947) 275–287.

Lasater, J. A., "Bubble Point Pressure Correlation," Trans., AIME 213 (1958) 379–381.

Vasquez, M. E. and Beggs, H. D., "Correlations for Fluid Physical Property Prediction," JPT (June 1980) 968–970.

Al-Marhoun, M. A., "PVT Correlations for Middle East Crude Oils," JPT (May 1988), 650–666.

Petrosky, G. E. Jr. And Farshad, F. F., "Pressure-Volume-Temperature Correlations for Gulf of Mexico Crude Oils," paper SPE 26644 presented at the 1993 SPE Annual Technical Conference and Exhibition, Houston, Tex. (October 3–6).

Asgarpour, S., McLauchlin, L., Wong, D., and Cheung, V., "Pressure-Volume-Temperature Correlations for western Canada Gases and Oils," JCPT, 28, No. 4 (July–August 1989) 103–111.

Dokla, M. E. and Osman, M. E., "Correlation of PVT Properties of UAE Crudes," SPEFE (March 1992) 41–46.

Obomanu, D. A. and Okpobiri, G. A., "Correlating the PVT Properties of Nigerian Crudes," J. Energy ResourcesTech., Trans. ASME Vol. 109 (December 1987) 214–217.

Farshad, F. F, Leblanc, J. L., Garber, J. D. and Osorio, J. G.,"Empirical PVT Correlations for Columbian Crude Oils," paper SPE 24538, (1992).

Kartoatmodjo, F. and Schmidt, Z., "Large Dat Bank Improves Crude Oil Physical Property Correlations," OGJ (Jul. 4, 1994), 51–55.

Beal, C., "The Viscosity of Air, Water, Natural Gas, Crude Oil and Its Associated Gases at Oil Field Temperatures and Pressures," Trans., AIME 165 (1946) 94–115.

Beggs, H. D. and Robinson, J. R., "Estimating the Viscosity of Crude Oil Systems," JPT (September 1975) 1140–1141.

Egbogah, E. O., "An Improved Temperature-Viscosity Correlation for Crude Oil Systems," paper 83-34-32 presented at the 1983 Annual Technical Meeting of the Petroleum Society of CIM, Banff, Alberta (May 10–13).

Khan, S. A., Al-Marhoun, M. A., Duffuaa, S. O., and Abu-Khamsin, S. A., "Viscosity Correlations for Saudi Arabian Crude Oils," paper SPE 15720 presented at the 1987 SPE Middle East Oil Show, Manama, Bahrain (March 7–10).

Chew, J. and Connally, C. A. Jr., "A Viscosity Correlation for Gas-Saturated Crude Oils," Trans., AIME 216 (1959) 23–25.

Calhoun, J. C. Jr., Fundamentals of Reservoir Engineering, University of Oklahoma Press, Norman, Okla. (1947), 35.

Trube, A. S., "Compressibility of Undersaturated Hydrocarbon Reservoir Fluids," Trans., AIME 210 (1957) 341–344.

Doublet, L. E., Pande, P. K., McCollum, T. J., and Blasingame, T. A., "Decline Curve Analysis Using Type Curves—Analysis of Oil Well Production Data Using Material Balance Time: Application to Field Cases," paper SPE 28688 presented at 1994 Petroleum Conference an Exhibition, Veracruz, Mexico (October 10–13).

Shih, M. Y. and Blasingame, T. A., "Decline Curve Analysis Using Type Curves: Horizontal Wells," paper SPE 29572 presented at 1995 SPE Joint Rocky Mountain Regional and Low Permeability Reservoirs Symposium, Denver, Colo., (March 19–22).

Doublet, L. E., and Blasingame, T. A., "Decline Curve Analysis Using Type Curves: Water Influx/Waterflood Cases," paper SPE 30774 presented at 1995 SPE Annual Technical Conference and Exhibition, Dallas, Tex. (October 22–25).

Doublet, L. E. and Blasingame, T. A., "Evaluation of Injection Well Performance Using Decline Type Curves," paper SPE 35205 presented at 1996 SPE Permian Basin Oil and Gas Recovery Conference, Midland, Tex. (March 27–29).

Fetkovitch, M. J., "Decline Curve Analysis Using Type Curves," JPT (1980).

Jennings, J. W., Poe, B. D. Jr., Gold, D. K., Ryan, R. J., and Oden, R. D.,"Deliverability Testing of natural Gas Wells," Texas A&M University (August 1989).

Gold, D. K., McCain, W. D. Jr., and Jennings, J. W., "An improved Method for the Determination of the Reservoir Gas Gravity for Retrograde Gases," paper SPE 17310 presented at the 1988 Permian Basin Oil and Gas Recovery Conference, Midland, Tex. (March 10–11).

Thompson, R. S. and Wright, J. D., Oil Property Evaluation, 2$^{nd}$ ed. Thompson-Wright Associates, Golden, Colo. (1985).

The invention has been described in the more limited aspects of preferred embodiments hereof, including numerous examples. Other embodiments have been suggested and still others may occur to those skilled in the art upon a reading and understanding of the this specification. It is intended that all such embodiments be included within the scope of this invention.

What is claimed is:

1. A device comprising means for storing instructions, said instructions adapted to be executed by a processor of a computer, said instructions when executed by the processor executing a process comprising the steps of:
    (a) providing first raw data representing the production behavior of a reservoir or well,
    (b) calculating first values using said first raw data, said first values correlating to said first raw data, the first values representing reservoir flow rates, cumulative production, and bottom hole flowing pressures,
    (c) calculating from said first values a set of second values, said second values representing production data analysis results which characterize said reservoir or well, said production data analysis results having varying degrees of reliability,
    (d) determining the most reliable production data analysis result of step (c) using best indicator logic procedure,
    (e) obtaining a production forecast representing the production rates and cumulative production of said reservoir or well, based upon the most reliable production data analysis result, and
    (f) displaying the production forecast as an amount of production from the reservoir or well over time.

2. The device of claim 1 wherein the instructions adapted to be executed by the processor calculate said second values representing production analysis results comprising produced fluid ratios, said produced fluid ratios comprising one or more of the following: a water/oil ratio, a gas/oil ratio, and a water/gas ratio.

3. The device of claim 1 wherein the production analysis results comprising a steady state material balance analysis of said first values.

4. The device of claim 1 wherein the production analysis results comprise quantitative analysis of said first values, wherein said second values represent formation effective permeability, reservoir pore volume or drainage area, steady state skin effect, and boundary dominated flow decline parameters.

5. The device of claim 1 wherein the production analysis results comprise quantitative non-linear minimization of said first values, said minimization providing estimates of permeability, skin effect, fracture half-length and conductivity, effective horizontal well length, dual porosity reservoir parameters, and reservoir drainage area.

6. The device of claim 1 wherein the step of determining the most reliable production data analysis result in step (d) comprises one or more of the following: (1) a time range validity test of said first values, (2) a well and reservoir model validity test, (3) an outlying data point minimization, or (4) an automated matching statistical best fit of said first values.

7. The device of claim 1 comprising means for storing instructions, said instructions adapted to be executed by a processor of a computer, said instructions when executed by the processor executing a process comprising the additional step of:
    (g) optimizing the calculated production rate of said reservoir or well.

8. The device of claim 7 comprising means for storing instructions, said instructions adapted to be executed by a processor of a computer, said instructions when executed by the processor executing a process, further wherein optimizing the calculated production rate of said reservoir or well comprises one or more of the following: (1) increasing recoverable hydrocarbons in place, (2) maximizing production rates, or (3) minimizing operating costs.

9. A method for evaluating the production performance of a subterranean reservoir, comprising:
    (a) obtaining a set of production data from surface production regulating devices, the data comprising volumes of oil, gas, and water produced from said subterranean reservoir,
    (b) providing the data to a computer, the computer having a processor for manipulating data, the computer having electronic storage means for storing equations which comprise petroleum industry-accepted production analysis relationships,
    (c) computing by said processor a set of values by manipulating said data, wherein the values provide reliable estimates using analytical techniques, the analytical techniques being selected from the group of water control diagnostics, material balance, decline curve analysis, and non-linear minimization, wherein the most reliable estimates obtained are capable of determining the most correct estimate of said values,
    (d) optimizing the calculated oil or gas production from the well.

10. The method of claim 9 wherein the values computed comprise one or more of the following: drainage area, permeability, fracture half-length, fracture conductivity, effective horizontal well length, steady state skin effect, and boundary dominated flow parameters.

11. The method of claim 10 wherein the production performance of the subterranean reservoir is a financial investment, wherein the production from the subterranean reservoir has a net present value, further wherein the optimization step comprises causing the wellbore to flow at a rate that maximizes the net present value of the investment.

12. The method of claim 10 wherein reservoir has a discounted cash flow rate of return, further wherein the optimization of the production performance of the subterranean reservoir is adjusted to facilitate a hydrocarbon flow rate that maximizes the discounted cash flow rate of return for that reservoir.

13. The method of claim 10 wherein reservoir has an appreciation of equity rate of return, further wherein the optimization of the production performance of the subterranean reservoir is accomplished by adjusting the rate of hydrocarbon production by maximizing the appreciation of equity rate of return.

14. The method of claim 10 wherein reservoir has a pay out time, further wherein the optimization of the production performance of the subterranean reservoir comprises adjusting the hydrocarbon flow such as to minimize the pay out time.

15. A method for evaluating the production performance of a subterranean reservoir, comprising:
    (a) obtaining a set of production data from surface production regulating devices, the set of data comprising volumes of oil, gas, and water produced from said subterranean reservoir,
    (b) providing the data to a computer, the computer having a processor for manipulating data, the computer having electronic storage means for storing equations which comprise petroleum industry-accepted production analysis relationships, (c) computing by said processor a set of values by manipulating said data, wherein the values computed comprise drainage area, permeability, fracture half-length, fracture conductivity, effective horizontal well length, steady state skin effect, or boundary dominated flow parameters, (d) further wherein the values provide reliable estimates using analytical techniques, the analytical techniques being selected from water control diagnostics, material balance, decline curve analysis, and non-linear minimization, wherein the most reliable estimates obtained are capable of determining the most correct estimate of said values, (e) optimizing the oil or gas production from the well by adjusting the flow rate of oil, gas and water from said reservoir.

16. A method for optimizing the production performance of a subterranean well, comprising:

(a) providing a data acquisition device operably connected to a well, (b) accumulating data using said data acquisition device, the data comprising the amount of oil, gas, and water produced from a subterranean formation, (c) providing a computer, (d) providing a data transmission medium, the data transmission medium connecting the data acquisition device to a computer, (e) communicating the data from the data acquisition device to a computer using said data transmission medium, (f) providing the data to said computer, the computer having a processor capable of manipulating data, the processor having operably connected electronic storage means having stored equations representing production analysis relationships, (g) computing by said processor a set of values by manipulating said data, wherein the values computed comprise drainage area, permeability, fracture half-length, fracture conductivity, effective horizontal well length, steady state skin effect, or boundary dominated flow parameters, and (h) further wherein the values are provide reliable estimates using analytical techniques, the analytical techniques being selected from water control diagnostics, material balance, decline curve analysis, and non-linear minimization, further wherein the most reliable estimates obtained are capable of determining the most correct estimate of said values, and (i) displaying said analytical technique(s).

17. In reservoir production analysis wherein raw data comprising oil and gas production volumes is recorded to produce a series of values representing the production, and wherein a computer is employed, the computer being adapted to process such reservoir production data, an article of manufacture comprising:

(a) magnetic storage means having encoded thereon instructions, (b) a computer, the computer having a processor, wherein the processor is operably connected to said magnetic storage means, (c) wherein raw data is provided representing the production volumes of a reservoir or well, the raw data including the volume of oil or gas produced out of flow lines or conduits from a well, (d) the processor being adapted to calculate values that correlate to said raw data, the values representing physical properties related to the reservoir or well which may be used to estimate future well production, (e) the processor for processing such data using a plurality of processing techniques to determine the most reliable processing technique among several techniques for estimating the production behavior in said reservoir, and (f) applying the techniques found most reliable to maximize future hydrocarbon production from said reservoir.

18. The article of manufacture of claim 17 further wherein the processor is adapted to calculate, from said values, at least two production data analysis results, the results being useful to characterize said reservoir, further wherein the processor determines the most reliable production data analysis result from among those calculated.

19. The article of manufacture of claim 18 further wherein the processor provides reliable estimates using analytical techniques, said techniques being selected from a group of techniques comprising material balance, decline curve analysis, non-linear minimization, wherein the most reliable estimates obtained with the analytical techniques are capable of determining the most correct estimate of said values.

20. The article of manufacture of claim 19 further wherein the processor is instructed to compute at least two of the following: drainage area, permeability, fracture half-length, fracture conductivity, effective horizontal well length, steady state skin effect, and boundary dominated flow parameters.

21. A system adapted to process data to optimize the hydrocarbon output from a wellbore, comprising:

means for collecting data representing oil and gas volumes or rates produced, means for sending a plurality of signals representing said data to a processing means, the signals being representative of a set of characteristics relating to physical properties of hydrocarbon production from a wellbore, processing means for generating a plurality of values from said plurality of signals, the values representing reservoir flow rates, cumulative production and bottomhole flowing pressures, means for sending a plurality of values to a processor, calculating means responsive to the plurality of values, the calculating means having an output of a plurality of a second set of values representing a plurality of separate production data analysis results, means for determining the reliability of each of said plurality of production data analysis results, means for choosing the most reliable production analysis method from among said production data analysis results, and means for displaying the production analysis results.

22. The system of claim 21 further wherein said production data analysis result is a water control diagnostic measurement.

23. The system of claim 21 further wherein said production data analysis result is a material balance measurement.

24. The system of claim 21 further wherein said production data analysis result is a decline curve measurement.

25. The system of claim 21 further wherein said production data analysis result is a wellbore history matching measurement.

26. The system of claim 21 further wherein the means for determining the reliability of the production analysis result includes means for discarding undesirable outlier data points.

27. The system of claim 21 further wherein the means for optimizing the output of hydrocarbons from the wellbore comprises a single layer forecast.

28. The system of claim 21 wherein the means for optimizing the output of hydrocarbons from the wellbore comprises a multi-layer forecast.

29. The system of claim 21 further wherein a means for collecting data representing oil and gas volumes or rates produced comprises a wellhead meter.

30. A method of predicting which production data analysis technique, among a plurality of such techniques, provides an accurate measure of physical values, comprising:
 (a) providing first data representing the production behavior of a reservoir,
 (b) calculating first values using said first data, said first values correlating to said first data, the first values representing flow rates and pressures of said reservoir,
 (c) calculating from said first values a set of second values, said second values representing production data analysis results which characterize said reservoir or well, said production data analysis results having varying degrees of reliability,
 (d) determining the most reliable production data analysis result, and
 (e) displaying the identity of the most reliable production data analysis result.

31. The method of claim 30 further wherein the second values comprise formation effective permeability, reservoir pore volume, reservoir drainage area, steady state skin effect, and boundary dominated flow decline parameters.

32. The method of claim 30 further wherein the step of determining the most reliable production data analysis result further comprises the proper remediation of effects of outlier data points.

33. A method for the efficient production of hydrocarbons, comprising the steps of:
 (a) providing first data representing the production behavior of a reservoir,
 (b) calculating first values using said first data, said first values correlating to said first data, the first values representing flow rates and pressures of said reservoir,
 (c) calculating from said first values a set of second values, said second values representing production data analysis results which characterize said reservoir or well, said production data analysis results having varying degrees of reliability,
 (d) determining the most reliable production data analysis result,
 (e) employing the analysis method representing the most reliable production data analysis result of step (d) to calculate from said first values a set of third values, the set of third values comprising a set of optimum wellbore flow parameters, and
 (f) employing said set of third values of optimum wellbore flow parameters to maximize the calculated efficiency of hydrocarbon production.

34. A device comprising a pre-recorded means readable by a computer and carrying instructions for a process, comprising the steps of:
 (a) providing first data representing the production behavior of a reservoir,
 (b) calculating first values from said first data, the first values representing flow rates and pressures of said reservoir,
 (c) calculating from said first values a set of second values, said second values representing production data analysis results which characterize said reservoir or well, said production data analysis results having varying degrees of reliability and being capable of display on a monitor operably connected to said computer,
 (d) determining the most reliable production data analysis result,
 (e) employing the analysis method representing the most reliable production data analysis result of step (d) to calculate from said first values a set of third values, the set of third values comprising a set of optimum wellbore flow parameters, and
 (f) employing said wellbore flow parameters to maximize the efficiency of hydrocarbon production.

35. The device of claim 34, wherein said pre-recorded means is selected from the group of magnetic tape, a magnetic disk, an optical disk and a CD-ROM.

36. The device of claim 34, wherein the step (d) comprises the steps of: minimizing the outlier data points, and obtaining the statistical best fit of said first values.

37. The device of claim 34, wherein the step (d) comprises conducting a time range validity test of said first values.

38. A method of determining the parameters and identity of well servicing techniques necessary to maximize the hydrocarbon output of a well, comprising:
 (a) obtaining a set of production data from surface production regulating devices, the data comprising volumes of oil, gas, and water produced from said subterranean reservoir,
 (b) providing the data to a computer, the computer having a processor for manipulating data, the computer having electronic storage means for storing equations which comprise petroleum industry-accepted production analysis relationships,
 (c) computing by said processor a set of values by manipulating said data, wherein the values computed comprise drainage area, permeability, fracture half-length, fracture conductivity, effective horizontal well length, steady state skin effect, or boundary dominated flow parameters,
 (d) further wherein the values are provide reliable estimates using analytical techniques, the analytical techniques being selected from water control diagnostics, material balance, decline curve analysis, and non-linear minimization, wherein the most reliable estimates obtained are capable of determining the most correct estimate of said values, and
 (e) optimizing the oil or gas production from the well.

39. A method for evaluating the production performance of a subterranean reservoir, comprising:
 (a) providing a set of production data to a computer, the computer having a processor capable of manipulating data, the computer having electronic storage means for storing equations which comprise a plurality of petroleum industry-accepted production analysis relationships,
 (b) computing by said processor a set of values by manipulating said data, wherein the values are capable of providing reliable estimates using analytical techniques, the analytical techniques being selected from the group of water control diagnostics, material balance, decline curve analysis, and non-linear minimization, wherein the most reliable estimates obtained are capable of determining the most correct estimate of said values, and (c) controlling the production of fluids and/or gas from the reservoir based upon the most reliable estimates of said values.

40. A method of maximizing the efficiency of hydrocarbon production above the ground from a reservoir located beneath the surface of the ground in a subterranean formation, comprising the steps of:

(a) providing first data representing production behavior of said reservoir, said first data comprising
  (1) fluid properties measured at the surface of the ground,
  (2) rate or volume of oil or gas produced,
  (3) wellhead production flowing pressures and temperatures, (b) calculating first values using said first data, said first values correlating to said first raw data, the first values representing reservoir flow rates, cumulative production amounts, and bottom hole flowing pressures, (c) calculating from said first values a set of second values, said second values representing production data analysis results which characterize said reservoir or well, said production data analysis results having varying degrees of reliability, (d) determining the most reliable production data analysis result of step (c), (e) obtaining a production forecast representing the production rates or cumulative production of said reservoir or well based upon the most reliable production data analysis result.

41. The method of claim 40 further comprising the following step:

(f) displaying the production forecast as an amount of production from the reservoir as a function of time.

42. The method of claim 40 further comprising the additional step of:

(f) increasing or decreasing the amount of hydrocarbons flowing from the reservoir to the surface of the ground.

43. The method of claim 40 further comprising the additional step of:

(f) fracturing the subterranean formation.

44. The method of claim 40 further comprising the step of:

(f) acidizing the formation.

45. The method of claim 40 further wherein the subterranean formation has at least one water producing zone and at least one oil or gas producing zone, comprising the additional step of:

(f) shutting off fluid production from the water producing zone.

* * * * *